United States Patent
Pick et al.

(10) Patent No.: US 12,445,326 B2
(45) Date of Patent: Oct. 14, 2025

(54) ASYMMETRIC CONSTELLATIONS FOR CHANNEL CHARACTERIZATION

(71) Applicant: QUALCOMM Incorporated, San Diego, CA (US)

(72) Inventors: Jacob Pick, Mevaseret Zion (IL); Shay Landis, Hod Hasharon (IL); Peer Berger, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 18/485,075

(22) Filed: Oct. 11, 2023

(65) Prior Publication Data

US 2025/0125997 A1    Apr. 17, 2025

(51) Int. Cl.
  *H04L 25/02* (2006.01)
  *H04L 27/34* (2006.01)
  *H04L 27/36* (2006.01)
  *H04L 27/38* (2006.01)

(52) U.S. Cl.
  CPC ...... *H04L 25/0238* (2013.01); *H04L 27/3444* (2013.01); *H04L 27/363* (2013.01); *H04L 27/3872* (2013.01)

(58) Field of Classification Search
  CPC ............. H04L 25/0238; H04L 27/3444; H04L 27/363; H04L 27/3872
  USPC .......................................... 375/260–261, 340
  See application file for complete search history.

(56) References Cited

U.S. PATENT DOCUMENTS

| | | | |
|---|---|---|---|
| 10,826,746 B1 * | 11/2020 | James | H04L 27/3405 |
| 2007/0204205 A1 * | 8/2007 | Niu | H04N 19/67 714/780 |
| 2012/0182914 A1 * | 7/2012 | Hariharan | H04L 1/189 370/329 |
| 2014/0273852 A1 * | 9/2014 | McCormack | H04B 5/72 455/41.2 |
| 2019/0182097 A1 * | 6/2019 | Klenner | H04L 1/0071 |
| 2020/0127880 A1 * | 4/2020 | Szili | H04L 27/3422 |

* cited by examiner

*Primary Examiner* — Emmanuel Bayard
(74) *Attorney, Agent, or Firm* — Holland & Hart LLP

(57) ABSTRACT

In some aspects of the systems, methods, and devices described herein, one or more asymmetric modulation constellations may be utilized. For example, a modulation constellation utilized to modulate data symbols may be asymmetric. In some approaches, an asymmetric modulation constellation may be generated by introducing a phase shift (e.g., cyclic shift, phase rotation) to one or more constellation points of a modulation constellation. An asymmetric modulation constellation may allow detecting phase shifts without ambiguity. For example, a user equipment (UE) may perform channel estimation or phase noise estimation aided by data symbols that are modulated with an asymmetric modulation constellation. In some examples, a UE may receive a message from a network entity indicating a configuration of an asymmetric modulation constellation. The UE may demodulate data symbols of a data signal based on a channel characterization estimate that is associated with the configuration of the asymmetric modulation constellation.

28 Claims, 17 Drawing Sheets

ASYMMETRIC CONSTELLATIONS FOR CHANNEL CHARACTERIZATION

FIELD OF TECHNOLOGY

The following relates to wireless communications, including asymmetric constellations for channel characterization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

In some wireless communication systems, one or more asymmetric modulation constellations may be utilized. For example, a modulation constellation utilized to modulate data symbols may be asymmetric. In some approaches, an asymmetric modulation constellation may be generated by introducing a phase shift (e.g., cyclic shift, phase rotation) to one or more constellation points of a modulation constellation. An asymmetric modulation constellation may allow detecting phase shifts without ambiguity. For example, a user equipment (UE) may perform channel estimation or phase noise estimation aided by data symbols that are modulated with an asymmetric modulation constellation. In some examples, a UE may receive a message from a network entity indicating a configuration of an asymmetric modulation constellation for demodulation of a data signal from the network entity. The UE may receive the data signal, which includes data symbols modulated in accordance with the asymmetric modulation constellation. The UE may demodulate the data symbols of the data signal based on a channel characterization estimate (e.g., a phase noise estimate, a channel estimation, or a combination thereof) of the data signal, where the channel characterization estimate is associated with (e.g., based on) the configuration of the asymmetric modulation constellation. In some examples, the UE may generate the channel characterization estimate of the data signal when the UE is using non-demodulation reference signal (non-DMRS) or non-phase tracking reference signal (non-PTRS)-based phase noise estimation or channel estimation. Reducing the DMRS or PTRS usage may improve spectral efficiency when performing the channel estimation and phase noise estimation using the data signal.

A method for wireless communications by a UE is described. The method may include receiving, from a network entity, a message indicating a configuration of an asymmetric modulation constellation for demodulation of at least one wireless data signal from the network entity, receiving a wireless data signal from the network entity, the wireless data signal including data symbols modulated in accordance with the asymmetric modulation constellation, and demodulating the data symbols of the wireless data signal based on a channel characterization estimate of the wireless data signal, the channel characterization estimate associated with the configuration of the asymmetric modulation constellation.

A UE for wireless communications is described. The UE may include one or more memories storing processor executable code, and one or more processors coupled with the one or more memories. The one or more processors may individually or collectively operable to execute the code to cause the UE to receive, from a network entity, a message indicating a configuration of an asymmetric modulation constellation for demodulation of at least one wireless data signal from the network entity, receive a wireless data signal from the network entity, the wireless data signal including data symbols modulated in accordance with the asymmetric modulation constellation, and demodulate the data symbols of the wireless data signal based on a channel characterization estimate of the wireless data signal, the channel characterization estimate associated with the configuration of the asymmetric modulation constellation.

Another UE for wireless communications is described. The UE may include means for receiving, from a network entity, a message indicating a configuration of an asymmetric modulation constellation for demodulation of at least one wireless data signal from the network entity, means for receiving a wireless data signal from the network entity, the wireless data signal including data symbols modulated in accordance with the asymmetric modulation constellation, and means for demodulating the data symbols of the wireless data signal based on a channel characterization estimate of the wireless data signal, the channel characterization estimate associated with the configuration of the asymmetric modulation constellation.

A non-transitory computer-readable medium storing code for wireless communications is described. The code may include instructions executable by a processor to receive, from a network entity, a message indicating a configuration of an asymmetric modulation constellation for demodulation of at least one wireless data signal from the network entity, receive a wireless data signal from the network entity, the wireless data signal including data symbols modulated in accordance with the asymmetric modulation constellation, and demodulate the data symbols of the wireless data signal based on a channel characterization estimate of the wireless data signal, the channel characterization estimate associated with the configuration of the asymmetric modulation constellation.

Some examples of the method, UEs, and non-transitory computer-readable medium described herein may further include operations, features, means, or instructions for transmitting, to the network entity, a capability message indicating a capability of the UE to support asymmetric modulation constellations, where the message indicating the configuration of the asymmetric modulation constellation is received in response to transmitting the capability message.

In some examples of the method, UEs, and non-transitory computer-readable medium described herein, the capability message indicates a capability of the UE to support channel characterization estimation without receiving downlink pilot signaling or with reduced downlink pilot signaling, the reduced downlink pilot signaling including a first amount of pilot signaling received within a timespan or a frequency span that may be smaller than a second amount of pilot signaling associated with an absence of the capability of the UE.

Some examples of the method, UEs, and non-transitory computer-readable medium described herein may further include operations, features, means, or instructions for determining the channel characterization estimate based on the configuration of the asymmetric modulation constellation and at least one data symbol of the data symbols.

In some examples of the method, UEs, and non-transitory computer-readable medium described herein, determining the channel characterization estimate may include operations, features, means, or instructions for determining a first rotation section of a first set of rotation sections associated with the at least one data symbol, determining a phase rotation within the first rotation section associated with the at least one data symbol, determining a second rotation section of a second set of rotation sections that disambiguates the at least one data symbol, and generating a phase noise estimate based on the phase rotation and the second rotation section that disambiguates the at least one data symbol.

In some examples of the method, UEs, and non-transitory computer-readable medium described herein, the channel characterization estimate includes a phase noise estimate, a channel estimate, or a combination thereof.

In some examples of the method, UEs, and non-transitory computer-readable medium described herein, the message may be associated with downlink control information indicating a symmetric modulation constellation, the message including an index indicating the asymmetric modulation constellation associated with the symmetric modulation constellation.

Some examples of the method, UEs, and non-transitory computer-readable medium described herein may further include operations, features, means, or instructions for determining, based on the index, the asymmetric modulation constellation from a group of asymmetric modulation constellations associated with the symmetric modulation constellation.

In some examples of the method, UEs, and non-transitory computer-readable medium described herein, the message indicating the asymmetric modulation constellation indicates a phase shift to a constellation point of the symmetric modulation constellation.

In some examples of the method, UEs, and non-transitory computer-readable medium described herein, the symmetric modulation constellation may be included in a set of symmetric modulation constellations, each symmetric modulation constellation of the set of symmetric modulation constellations associated with a respective asymmetric modulation constellation of a set of asymmetric modulation constellations and each respective asymmetric modulation constellation of the set of asymmetric modulation constellations includes a different angular rotation of a respective constellation point relative to at least one other angular rotation of at least one other asymmetric modulation constellation in the set of asymmetric modulation constellations.

In some examples of the method, UEs, and non-transitory computer-readable medium described herein, each asymmetric modulation constellation of the set of asymmetric modulation constellations may have a same average power as each associated symmetric modulation constellation of the set of symmetric modulation constellations.

In some examples of the method, UEs, and non-transitory computer-readable medium described herein, the asymmetric modulation constellation may be asymmetric with respect to a rotation symmetry of a symmetric modulation constellation associated with the asymmetric modulation constellation.

A method for wireless communications by a network entity is described. The method may include transmitting, to a UE, a message indicating a configuration of an asymmetric modulation constellation for demodulation of at least one wireless data signal from the network entity, modulating data symbols based on the configuration of the asymmetric modulation constellation, and transmitting a wireless data signal to the UE, the wireless data signal including the data symbols modulated in accordance with the asymmetric modulation constellation.

A network entity for wireless communications is described. The network entity may include one or more memories storing processor executable code, and one or more processors coupled with the one or more memories. The one or more processors may individually or collectively operable to execute the code to cause the network entity to transmit, to a UE, a message indicating a configuration of an asymmetric modulation constellation for demodulation of at least one wireless data signal from the network entity, modulate data symbols based on the configuration of the asymmetric modulation constellation, and transmit a wireless data signal to the UE, the wireless data signal including the data symbols modulated in accordance with the asymmetric modulation constellation.

Another network entity for wireless communications is described. The network entity may include means for transmitting, to a UE, a message indicating a configuration of an asymmetric modulation constellation for demodulation of at least one wireless data signal from the network entity, means for modulating data symbols based on the configuration of the asymmetric modulation constellation, and means for transmitting a wireless data signal to the UE, the wireless data signal including the data symbols modulated in accordance with the asymmetric modulation constellation.

A non-transitory computer-readable medium storing code for wireless communications is described. The code may include instructions executable by a processor to transmit, to a UE, a message indicating a configuration of an asymmetric modulation constellation for demodulation of at least one wireless data signal from the network entity, modulate data symbols based on the configuration of the asymmetric modulation constellation, and transmit a wireless data signal to the UE, the wireless data signal including the data symbols modulated in accordance with the asymmetric modulation constellation.

Some examples of the method, network entities, and non-transitory computer-readable medium described herein may further include operations, features, means, or instructions for receiving, from the UE, a capability message indicating a capability of the UE to support asymmetric modulation constellations, where the message indicating the configuration of the asymmetric modulation constellation is transmitted in response to receiving the capability message.

In some examples of the method, network entities, and non-transitory computer-readable medium described herein, the capability message indicates a capability of the UE to support channel characterization estimation without receiving downlink pilot signaling or with reduced downlink pilot signaling, the reduced downlink pilot signaling including a first amount of pilot signaling transmitted within a timespan or a frequency span that may be smaller than a second amount of pilot signaling associated with an absence of the capability of the UE.

In some examples of the method, network entities, and non-transitory computer-readable medium described herein, the message may be associated with downlink control information indicating a symmetric modulation constellation, the message including an index indicating the asymmetric modulation constellation associated with the symmetric modulation constellation.

In some examples of the method, network entities, and non-transitory computer-readable medium described herein, the message indicating the asymmetric modulation constellation indicates a phase shift to a constellation point of the symmetric modulation constellation.

In some examples of the method, network entities, and non-transitory computer-readable medium described herein, the symmetric modulation constellation may be included in a set of symmetric modulation constellations, each symmetric modulation constellation of the set of symmetric modulation constellations associated with a respective asymmetric modulation constellation of a set of asymmetric modulation constellations and each respective asymmetric modulation constellation of the set of asymmetric modulation constellations includes a different angular rotation of a respective constellation point relative to at least one other angular rotation of at least one other asymmetric modulation constellation in the set of asymmetric modulation constellations.

In some examples of the method, network entities, and non-transitory computer-readable medium described herein, each asymmetric modulation constellation of the set of asymmetric modulation constellations may have a same average power as each associated symmetric modulation constellation of the set of symmetric modulation constellations.

In some examples of the method, network entities, and non-transitory computer-readable medium described herein, the asymmetric modulation constellation may be asymmetric with respect to a rotation symmetry of a symmetric modulation constellation associated with the asymmetric modulation constellation.

DETAILED DESCRIPTION

Figure 1:
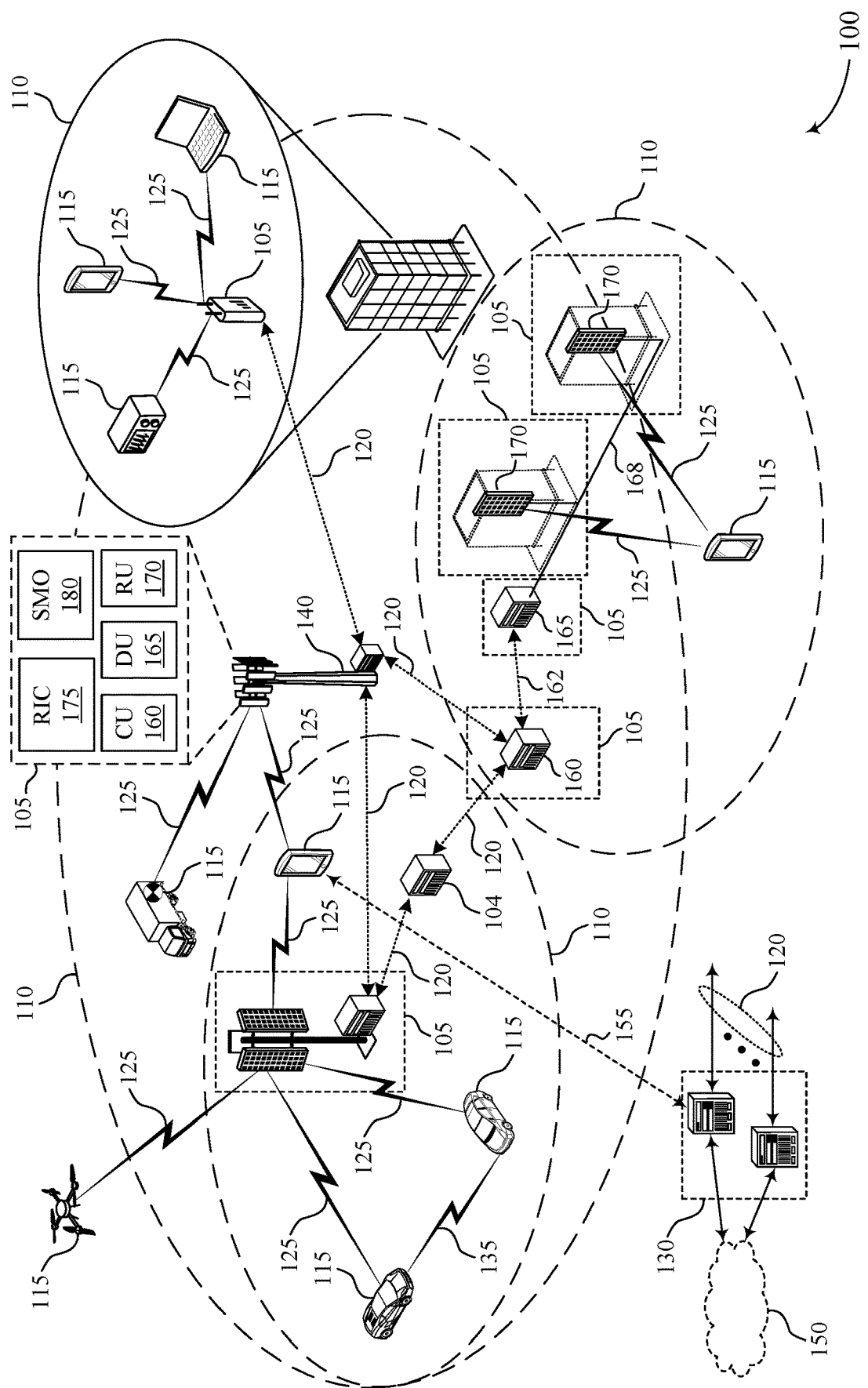
FIG. 1 shows an example of a wireless communications system that supports asymmetric constellations for channel characterization in accordance with one or more aspects of the present disclosure.

In some wireless communication systems, pilot signals (e.g., demodulation reference signals (DMRSs) or phase tracking reference signals (PTRSs)) may be utilized for channel estimation and phase rotation impairment estimation. In some cases, phase variation between pilot signals (e.g., between two PTRS orthogonal frequency division multiplexing (OFDM) symbols) or channel variation between two DMRSs may be relatively large, which may result in demodulation errors or decreased reception accuracy for data symbols between the pilot signals. In some approaches, data symbols (e.g., data OFDM symbols) may be utilized for phase noise estimation or channel estimation. For example, a user equipment (UE) may estimate the channel blindly to improve performance at relatively high Doppler and delay spread. However, when utilizing data symbols to aid with phase noise estimation, for example, the data symbols may present an ambiguity in detecting phase noise due to the symmetry of modulation constellations at various rotations. For example, quadrature amplitude modulation (QAM) constellations may be symmetric for 900 rotations. The symmetry of the modulation constellations may hinder the UE in estimating phase noise unambiguously.

In some aspects of the systems, methods, and devices described herein, one or more asymmetric modulation constellations may be utilized. For example, a modulation constellation utilized to modulate data symbols may be asymmetric. In some approaches, an asymmetric modulation constellation may be generated by introducing a phase shift (e.g., cyclic shift, phase rotation) to one or more constellation points of a modulation constellation. An asymmetric modulation constellation may allow detecting phase shifts without ambiguity. For example, a UE may perform channel estimation or phase noise estimation aided by data symbols that are modulated with an asymmetric modulation constellation. In some examples, a UE may receive a message from a network entity indicating a configuration of an asymmetric modulation constellation for demodulation of a data signal from the network entity. The UE may receive the data signal, which includes data symbols modulated in accordance with the asymmetric modulation constellation. The UE may demodulate the data symbols of the data signal based on a channel characterization estimate (e.g., a phase noise estimate, a channel estimation, or a combination thereof) of the data signal, where the channel characterization estimate is associated with (e.g., based on) the configuration of the asymmetric modulation constellation. In some examples, the UE may generate the channel characterization estimate of the data signal when the UE is using non-DMRS or non-PTRS-based phase noise estimation or channel estimation. Reducing the DMRS or PTRS usage may improve spectral efficiency when performing the channel estimation and phase noise estimation using the data signal.

Some examples of the techniques described herein may enable UEs to perform data-aided channel estimation or data-aided phase tracking (e.g., phase shift detection) without ambiguity. Some aspects of the techniques described herein may allow phase noise estimation without ambiguity when phase variation between PTRS OFDM symbols is relatively large or when channel variation between two DMRSs is relatively large. For instance, data OFDM symbols may be utilized to increase estimation accuracy. In some examples, the techniques described herein may improve UE and wireless communication system throughput by allowing the transmission of data instead of pilot signals. For instance, the UE may be enabled to mitigate phase rotations without pilot signals, which may allow dedicating resources to data transmissions instead of pilot transmissions.

Aspects of the disclosure are initially described in the context of wireless communications systems. Aspects of the disclosure are also described in the context of constellation diagrams, a graph, and a process flow diagram. Aspects of the disclosure are further illustrated by and described with reference to apparatus diagrams, system diagrams, and flowcharts that relate to asymmetric constellations for channel characterization.

FIG. 1 shows an example of a wireless communications system 100 that supports asymmetric constellations for channel characterization in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support asymmetric constellations for channel characterization as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some aspects of the systems, methods, and devices described herein, one or more asymmetric modulation constellations may be utilized. For example, a modulation constellation utilized to modulate data symbols may be asymmetric. In some approaches, an asymmetric modulation constellation may be generated by introducing a phase shift (e.g., cyclic shift, phase rotation) to one or more constellation points of a modulation constellation. An asymmetric modulation constellation may allow detecting phase shifts without ambiguity. For example, a UE 115 may perform channel estimation or phase noise estimation aided by data symbols that are modulated with an asymmetric modulation constellation. In some examples, a UE 115 may receive a message from a network entity 105 indicating a configuration of an asymmetric modulation constellation for demodulation of a data signal from the network entity 105. The UE 115 may receive the data signal, which includes data symbols modulated in accordance with the asymmetric modulation constellation. The UE 115 may demodulate the data symbols of the data signal based on a channel characterization estimate (e.g., a phase noise estimate, a channel estimation, or a combination thereof) of the data signal, where the channel characterization estimate is associated with the configuration of the asymmetric modulation constellation. In some examples, the UE 115 may generate the channel characterization estimate of the data signal when the UE 115 is using non-DMRS or non-PTRS-based phase noise estimation or channel estimation. Reducing the DMRS or PTRS usage may improve spectral efficiency when performing the channel estimation and phase noise estimation using the data signal.

Figure 2:
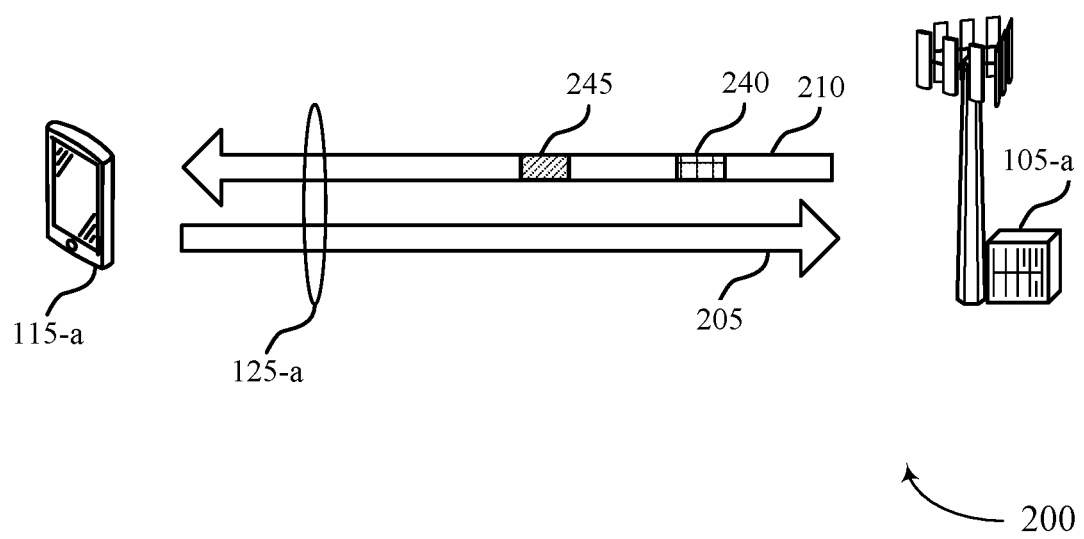
FIG. 2 shows an example of a wireless communication system that supports asymmetric constellations for channel characterization in accordance with one or more aspects of the present disclosure.

FIG. 2 shows an example of a wireless communications system 200 that supports asymmetric constellations for channel characterization in accordance with one or more aspects of the present disclosure. The wireless communications system 200 may implement aspects of or may be implemented by aspects of the wireless communications system 100. For example, the wireless communications system 200 includes a UE 115-a, which may be an example of a UE 115 described with respect to FIG. 1. The wireless communications system 200 also includes a network entity 105-a, which may be an example of a network entity 105 as described with respect to FIG. 1.

The UE 115-*a* may communicate with the network entity 105-*a* using a communication link 125-*a*, which may be an example of a communication link 125 described with respect to FIG. 1. The communication link 125-*a* may include a bi-directional link that enables both uplink and downlink network communications. For example, the UE 115-*a* may transmit one or more uplink transmissions 205, such as uplink control signals or uplink data signals, to the network entity 105-*a* using the communication link 125-*a*, and the network entity 105-*a* may transmit one or more downlink transmissions 210, such as downlink control signals or downlink data signals, to the UE 115-*a* using the communication link 125-*a*.

The network entity 105-*a* may transmit, to the UE 115-*a*, a message 245 indicating a configuration of an asymmetric modulation constellation for demodulation of a wireless data signal 240 from the network entity 105-*a*. The UE 115-*a* may receive the message 245. The asymmetric modulation constellation may be asymmetric with respect to a phase rotation of the asymmetric modulation constellation. A symmetric modulation constellation may have rotated constellation points that are located at the same positions as unrotated constellation points. For example, some symmetric modulation constellations, when rotated with a 45°, 90°, 180°, or other rotation, may have constellation points (e.g., all constellation points) positioned identically to unrotated constellation points. An asymmetric modulation constellation may include one or more constellation points, when rotated (to one or more rotations or any rotation within a range), that are positioned non-identically to one or more unrotated constellation points.

In some examples, the message 245 may indicate one or more indexes, a quantity of phase rotation of one or more constellation points, an amplitude quantity of one or more constellation points, an index associated with a quantity of phase rotation of one or more constellation points, one or more in-phase and quadrature (I, Q) values corresponding to one or more constellation points, or one or more other indications for an asymmetric modulation constellation. For instance, the network entity 105-*a* (e.g., gNB) may transmit an index with downlink control information (DCI), where the index indicates an asymmetric modulation constellation in a scenario where a DMRS or PTRS is not sent to the UE 115-*a*.

In some aspects, the message 245 may indicate one or more asymmetric modulation constellations relative to one or more symmetric modulation constellations. For instance, the message 245 indicating the asymmetric modulation constellation may indicate a phase shift to a constellation point of an associated symmetric modulation constellation. In some examples, the message 245 may be associated with (e.g., may be included in) DCI indicating a symmetric modulation constellation, where the message 245 may include an index indicating the asymmetric modulation constellation associated with the symmetric modulation constellation.

In some aspects, the symmetric modulation constellation is included in a set of symmetric modulation constellations. For instance, the network entity 105-*a*, the UE 115-*a*, or both may store a record of a set of symmetric modulation constellations. The message 245, DCI, or another message may indicate a selected symmetric modulation constellation from the set of symmetric modulation constellations. For instance, the network entity 105-*a* may transmit an indicator of a modulation and coding scheme (MCS) that indicates a selected symmetric modulation constellation.

In some approaches, each symmetric modulation constellation of the set of symmetric modulation constellations may be associated with a respective asymmetric modulation constellation of a set of asymmetric modulation constellations. For each symmetric modulation constellation, an index (of the message 245, for example) may be mapped to an asymmetric modulation constellation that is associated with the symmetric modulation constellation. For instance, an index "1" may indicate a phase shift of an upper right constellation point of all QAM constellations. In some examples, the index may include two bits, indicating a selection from four candidate asymmetric modulation constellations for each symmetric modulation constellation. An absence of the message 245, in some approaches, may indicate a configuration of one or more symmetric constellations.

In some aspects, each respective asymmetric modulation constellation of the set of asymmetric modulation constellations may include a different angular rotation of a respective constellation point relative to at least one other angular rotation of at least one other asymmetric modulation constellation in the set of asymmetric modulation constellations. For each asymmetric modulation constellation, for instance, a different quantity of rotation degrees may be assigned. Each asymmetric modulation constellation of the set of asymmetric modulation constellations may have a same average power or similar average power as (e.g., within ±20% of) each associated symmetric modulation constellation of the set of symmetric modulation constellations.

In some examples, the asymmetric modulation constellation may be asymmetric with respect to a rotation symmetry of a symmetric modulation constellation associated with the asymmetric modulation constellation. For instance, if a symmetric modulation constellation is symmetric with a 900 rotation, the associated asymmetric modulation constellation may be asymmetric with a 900 rotation.

The UE 115-*a* may receive, from the network entity 105-*a*, the message 245 indicating the configuration of the asymmetric modulation constellation for demodulation of at least one wireless data signal 240 from the network entity 105-*a*. In some aspects, the UE 115-*a* may utilize the message 245 to determine the asymmetric modulation constellation. For instance, the message 245 indicating the asymmetric modulation constellation may indicate a phase shift to a constellation point of the symmetric modulation constellation. In some examples, the UE 115-*a* may determine, based on an index, the asymmetric modulation constellation from a group of asymmetric modulation constellations associated with the symmetric modulation constellation. For instance, the UE 115-*a* may look up the asymmetric modulation constellation using an index from the message 245 or may apply a phase rotation to one or more constellation points of an associated symmetric modulation constellation based on the index to determine the asymmetric modulation constellation.

The UE 115-*a* may apply the configuration of the asymmetric modulation constellation. For example, the UE 115-*a* may configure circuitry (e.g., a modem of the UE 115-*a*) for demodulation of one or more signals based on the asymmetric modulation constellation.

The network entity 105-*a* may modulate one or more data symbols based on the configuration of the asymmetric modulation constellation. For instance, the network entity 105-*a* may modulate a digital signal into amplitude, phase, or frequency aspects of a data signal for transmission. In some examples, the data symbols may be mapped to constellation points of the asymmetric modulation constellation, and the mapped constellation points may indicate the amplitude, phase, or frequency aspects to generate the wireless data signal 240. For instance, one or more sets of bits (e.g., data bits, payload bits, non-overhead bits) may be mapped to one or more constellation points that cause a modulation constellation to be asymmetric.

The network entity 105-*a* may transmit the wireless data signal 240 to the UE 115-*a*, where the wireless data signal 240 includes the data symbols modulated in accordance with the asymmetric modulation constellation. For instance, the network entity 105-*a* may utilize one or more antennas to radiate the wireless data signal 240 as a radio frequency (RF) signal. The UE 115-*a* may receive the wireless data signal 240 from the network entity 105-*a*.

The UE 115-*a* may determine a channel characterization estimate based on the configuration of the asymmetric modulation constellation and at least one data symbol of the data symbols. The channel characterization estimate may include a phase noise estimate, a channel estimate, or a combination thereof. For example, the UE 115-*a* may estimate phase noise or a channel (e.g., a channel transfer function, phase response, frequency response, fading, Doppler, gain, signal-to-noise ratio (SNR), or path loss, among other examples) based on one or more data symbols.

In some aspects, determining the channel characterization estimate may include estimating phase noise using one or more data symbols. Some approaches to phase noise estimation may include performing a first (e.g., coarse) estimation, a second (e.g., fine) estimation, or ambiguity detection for an asymmetric modulation constellation.

For the first estimation, for example, the UE 115-*a* may determine a first rotation section of a first set of rotation sections associated with (e.g., based on) the at least one data symbol. The first set of rotation sections may include sections of a rotation (e.g., a full rotation, 360°, 2π). For instance, the first set of 32 rotation sections may provide 360°/32=11.25° per section. The first rotation section may be selected as a rotation section that that includes (or is nearest to) the actual rotation (e.g., the phase of a received data symbol).

The UE 115-*a* may determine a phase rotation within the first rotation section associated with (e.g., based on) the at least one data symbol. For example, the UE 115-*a* may determine a quantity of phase rotation of the data symbol within the selected rotation section (of the first set of rotation sections, for instance). Determining the first rotation section may be referred to as a "coarse" estimation because the first rotation section can be selected from a full rotation or may have a larger rotational range than the phase rotation within the first rotation section. Determining the first phase rotation may be referred to as a "fine" estimation because the first phase rotation range may be within (e.g., smaller than) the first rotation section. For example, the range of the first rotation section determination may be larger than a range of the first phase rotation determination.

The UE 115-*a* may determine a second rotation section of a second set of rotation sections that disambiguates the at least one data symbol. In some examples, the second set of rotation sections may include sections in which a corresponding symmetric modulation constellation is symmetric, but in which the asymmetric modulation constellation is asymmetric. For instance, the second set of rotation sections may include four rotation sections: 0°, 90°, 180°, and 270°, in which a QAM modulation constellation is symmetric, but in which the asymmetric modulation constellation is asymmetric due to the asymmetry in one or more of the constellation points. Determining the second rotation section may include determining a rotational distance between the received data symbol and positions of constellation points of the asymmetric modulation at each rotation of the second set of rotation sections. The second rotation section corresponding to the smallest rotational distance may be selected as the second rotation section. Determining the second rotation section may disambiguate a data symbol by determining a most likely rotation of the data symbol relative to the asymmetric modulation constellation. In contrast, comparing a data symbol to rotations of a symmetric modulation constellation may yield multiple (e.g., ambiguous) potential rotations having the same rotational distance.

The UE 115-*a* may generate a phase noise estimate based at least in part on the phase rotation and the second rotation section that disambiguates the at least one data symbol. For example, the UE 115-*a* may combine (e.g., add) the phase rotation to the phase of the second rotation section to generate the phase noise estimate. The phase noise estimate may be an example of the channel characterization estimate described herein. While some approaches to phase noise estimation are provided as some examples, other approaches to phase noise estimation using the asymmetric modulation constellation may be utilized in some other examples.

The UE 115-*a* may demodulate the data symbols of the wireless data signal based on the channel characterization estimate of the wireless data signal. As described herein, the channel characterization estimate may be based on the configuration of the asymmetric modulation constellation. For instance, a phase noise estimate or a channel estimate may be determined based on one or more differences (e.g., phase difference or amplitude difference) between the asymmetric modulation constellation and one or more received data symbols. The one or more differences may characterize the channel traversed by the one or more data symbols.

In some examples, the UE 115-*a* may demodulate the symbols of the wireless data signal 240 or one or more other data symbols based on the channel characterization estimate. For instance, the UE 115-*a* may compensate for the estimated phase noise or channel distortion indicated by the channel characterization estimate.

In some examples, the UE 115-*a* may transmit, to the network entity 105-*a*, a capability message (not shown in FIG. 2) indicating a capability of the UE 115-*a* to support one or more asymmetric modulation constellations. For instance, before the network entity 105-*a* sends the message 245 indicating the configuration of the asymmetric modulation constellation, the UE 115-*a* may transmit the capability message, and the configuration, the use, or both of the asymmetric modulation constellation may be based on the indicated capability of the UE 115-*a*.

In some examples, the capability message indicates a capability of the UE 115-*a* to support channel characterization estimation without receiving downlink pilot signaling or with reduced downlink pilot signaling. For instance, prior to RRC connection establishment, the UE 115-*a* may notify the network entity 105-*a* of a capability of the UE 115-*a* to support one or more asymmetric constellations or channel estimation without receiving downlink pilot signaling or with reduced downlink pilot signaling. The reduced downlink pilot signaling may include a first amount of pilot signaling communicated (e.g., transmitted or received) within a timespan or a frequency span that is smaller than a second amount of pilot signaling associated with an absence of the capability of the UE 115-*a*. For example, the UE 115-*a* may be capable of performing channel characterization without receiving downlink pilot signaling, or with reduced downlink pilot signaling in a time domain or in a frequency domain.

The network entity 105-a may receive, from the UE 115-a, the capability message indicating the capability of the UE 115-a to support asymmetric modulation constellations. In some examples, the network entity 105-a may transmit the message 245 indicating the configuration of the asymmetric modulation constellation in response to the capability message from the UE 115-a. The UE 115-a may receive the message 245 indicating the configuration of the asymmetric modulation constellation in response to transmitting the capability message.

In some examples, the UE 115-a or the network entity 105-a may operate in accordance with a first (e.g., data-aided) mode and a second (e.g., non-data-aided) mode. In the first mode, the network entity 105-a may transmit data symbols modulated in accordance with an asymmetric modulation constellation in conjunction with one or more reference signals (e.g., PTRS or DMRS) or without references signals (e.g., without PTRS or DMRS). The UE 115-a may utilize the data symbols to perform channel characterization and demodulate data as described herein. In the second mode, the network entity 105-a may transmit data symbols in accordance with a symmetric modulation constellation and may transmit one or more reference signals (e.g., PTRS or DMRS). The UE 115-a may utilize the one or more reference signals to perform channel characterization. In some examples, the message 245 may indicate a transition from the second mode to the first mode or the UE 115-a may transmit a control message requesting a transition from the second mode to the first mode. For instance, in a case that the UE 115-a or the network entity 105-a detects Doppler spread that satisfies a threshold value, a delay spread that satisfies a threshold value, or another channel condition, the UE 115-a of the network entity 105-a may request or initiate the transition from the second mode to the first mode. In some examples, the network entity 105-a may transmit a control signal or may refrain from sending the message 245, or the UE 115-a may transmit a control message to request or initiate a transition from the first mode to the second mode. For instance, in a case that the UE 115-a or the network entity 105-a detects Doppler spread that satisfies a threshold value, a delay spread that satisfies a threshold value, or another channel condition, the UE 115-a of the network entity 105-a may request or initiate the transition from the first mode to the second mode.

Utilizing the asymmetric modulation constellation may enhance channel characterization (e.g., phase noise estimation or channel estimation) accuracy, which may increase symbol demodulation accuracy. For example, utilizing the asymmetric modulation constellation may result in a reduced mean squared error (MSE) of a received symbol output of a minimum mean square error (MMSE) demodulator. In contrast, when a symmetric modulation constellation is utilized to characterize a channel (e.g., track phase), a receiver may potentially map a received symbol to an incorrect constellation point due to ambiguity, which may result in a demodulator producing erroneous data. In some approaches, data symbols may be transmitted more frequently than pilot signals (e.g., DMRS or PTRS). Utilizing data symbols for channel characterization may enable more frequent phase tracking and enhanced reception performance. In some approaches, utilizing data symbols with an asymmetric modulation constellation for channel characterization may enable channel characterization (e.g., phase tracking) without the use of pilot symbols, which may increase link efficiency. Utilizing an asymmetric modulation constellation may enable the UE 115-a to detect and compensate (e.g., partially or completely compensate) for phase rotation without ambiguity.

Figure 3:
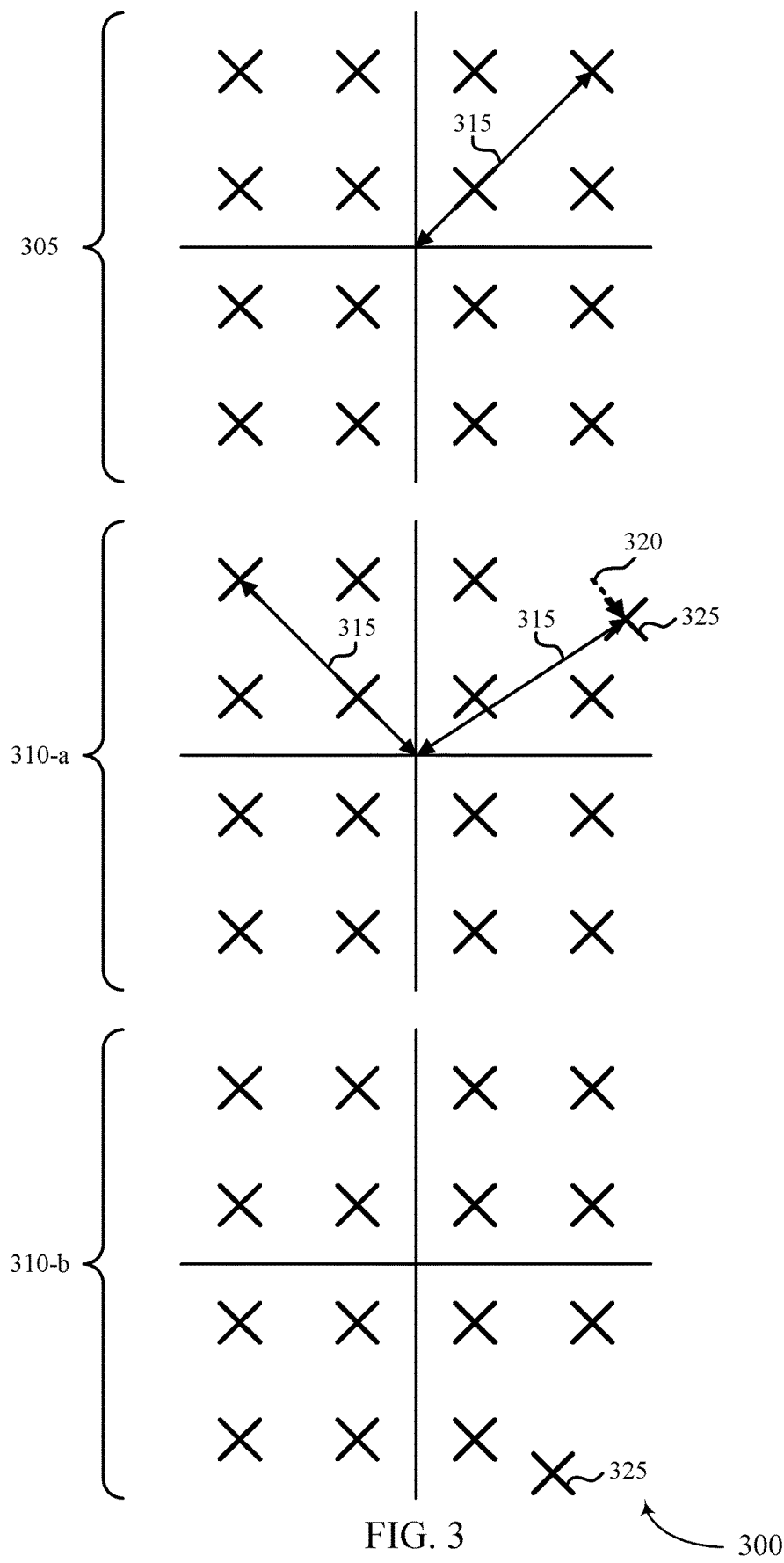
FIG. 3 shows an example of a diagram including an example of an asymmetric modulation constellation that supports asymmetric constellations for channel characterization in accordance with one or more aspects of the present disclosure.

FIG. 3 shows an example of a diagram 300 including an example of an asymmetric modulation constellation that supports asymmetric constellations for channel characterization in accordance with one or more aspects of the present disclosure. In particular, FIG. 3 illustrates an example of a symmetric modulation constellation 305 (e.g., a symmetric 16 QAM modulation constellation), an example of an asymmetric modulation constellation 310-a (e.g., asymmetric 16 QAM modulation constellation 310-a without rotation or with 0° rotation), and an example of a rotated asymmetric modulation constellation 310-b (e.g., the asymmetric 16 QAM modulation constellation with a 900 rotation).

As illustrated in FIG. 3, the symmetric modulation constellation 305 is symmetric for multiples of 900 rotations. For instance, the constellation points of the symmetric modulation constellation 305 are positioned identically for a −270°, −180°, −90°, 0°, 90°, 180°, or 2700 rotation, which can lead to ambiguities in determining phase noise using the symmetric modulation constellation 305.

The asymmetric modulation constellation 310-a illustrates how modifying (e.g., slightly modifying) the symmetric modulation constellation 305 may remove phase rotation ambiguity. As illustrated in FIG. 3, the upper-right (e.g., an edge) constellation point 325 is rotated by rotation quantity 320 (e.g., a few degrees) to produce the asymmetric modulation constellation 310-a. For instance, the constellation point 325 may be rotated or shifted within the asymmetric modulation constellation 310-a (e.g., rotated or shifted relative to one or more other constellation points in the asymmetric modulation constellation 310-a). In some examples, the constellation point 325 may be misaligned relative to a regular structure (e.g., row or column) of other constellation points in the asymmetric modulation constellation 310-a. While one edge constellation point 325 is shown as rotated in FIG. 3, a different constellation point, one or more constellation points, one or more edge constellation points, or one or more interior constellation points may differ from one or more constellation points of a corresponding symmetric modulation constellation in some examples. In some examples, the network entity 105-a may indicate the asymmetric modulation constellation 310-a relative to an associated symmetric modulation constellation 305 as described with reference to FIG. 2. While asymmetric 16 QAM may be utilized in some examples, other asymmetric modulation constellations (e.g., asymmetric 8 QAM, 32 QAM, 64 QAM, 128 QAM, quadrature phase-shift keying (QPSK), among other examples) may be utilized in other examples.

In some approaches, the constellation point 325 (e.g., edge symbol) may be rotated while maintaining the same average power as the symmetric modulation constellation 305. For example, the constellation point 325 is rotated while maintaining a distance 315 to the origin relative to a corresponding constellation point of the symmetric modulation constellation 305. The distance 315 may also be the same as a distance of another constellation point of the asymmetric modulation constellation 310-a while being positioned asymmetrically. As illustrated by the rotated asymmetric modulation constellation 310-b, the asymmetric modulation constellation 310-a is asymmetric with a 90° phase rotation. The inherent ambiguity of the symmetric modulation constellation 305 to 90° phase rotations may be mitigated by utilizing the asymmetric modulation constellation 310-a. For example, the ambiguity effect of the symmetric modulation constellation 305 may be resolved by utilizing the asymmetric modulation constellation 310-a.

Figure 4:
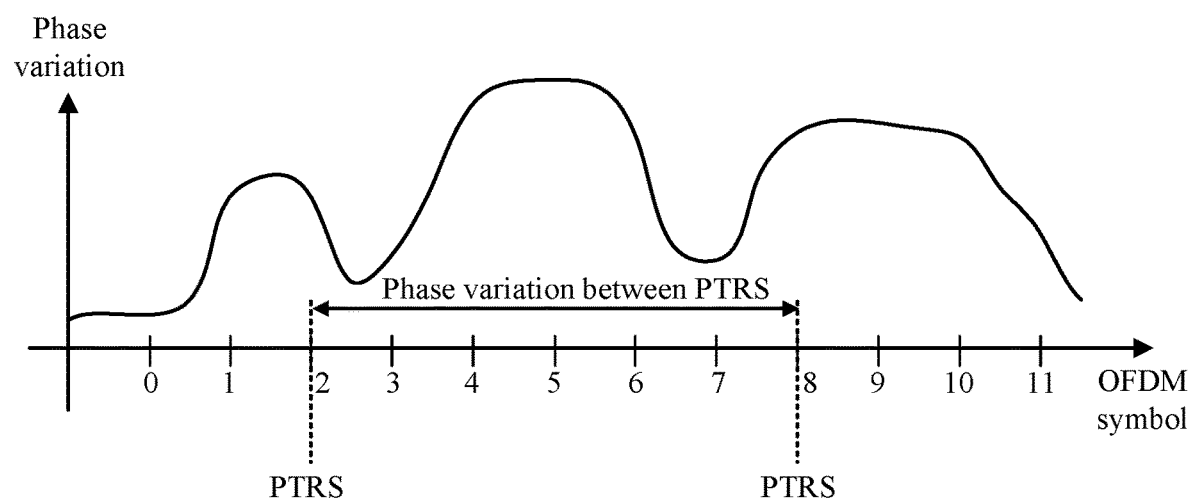
FIG. 4 shows an example of a graph that supports asymmetric constellations for channel characterization in accordance with one or more aspects of the present disclosure.

FIG. 4 shows an example of a graph 400 that supports asymmetric constellations for channel characterization in accordance with one or more aspects of the present disclosure. In particular, FIG. 4 illustrates phase variations on the vertical axis relative to OFDM symbols on the horizontal axis. In FIG. 4, symbols 2 and 8 may carry PTRSs. As shown in FIG. 4, relatively large phase variations may occur between PTRS symbols. Due to the phase variations, the PTRS symbols alone may be inadequate to track the phase.

In some examples of the techniques described herein, data symbols (e.g., symbols 3-7) may be modulated in accordance with an asymmetric modulation constellation and may be utilized to characterize a channel (e.g., track phase) between pilot signals or without pilot signals. For instance, data symbols 3-7 may be utilized to track phase between the PTRS symbols to improve channel estimation.

Figure 5:
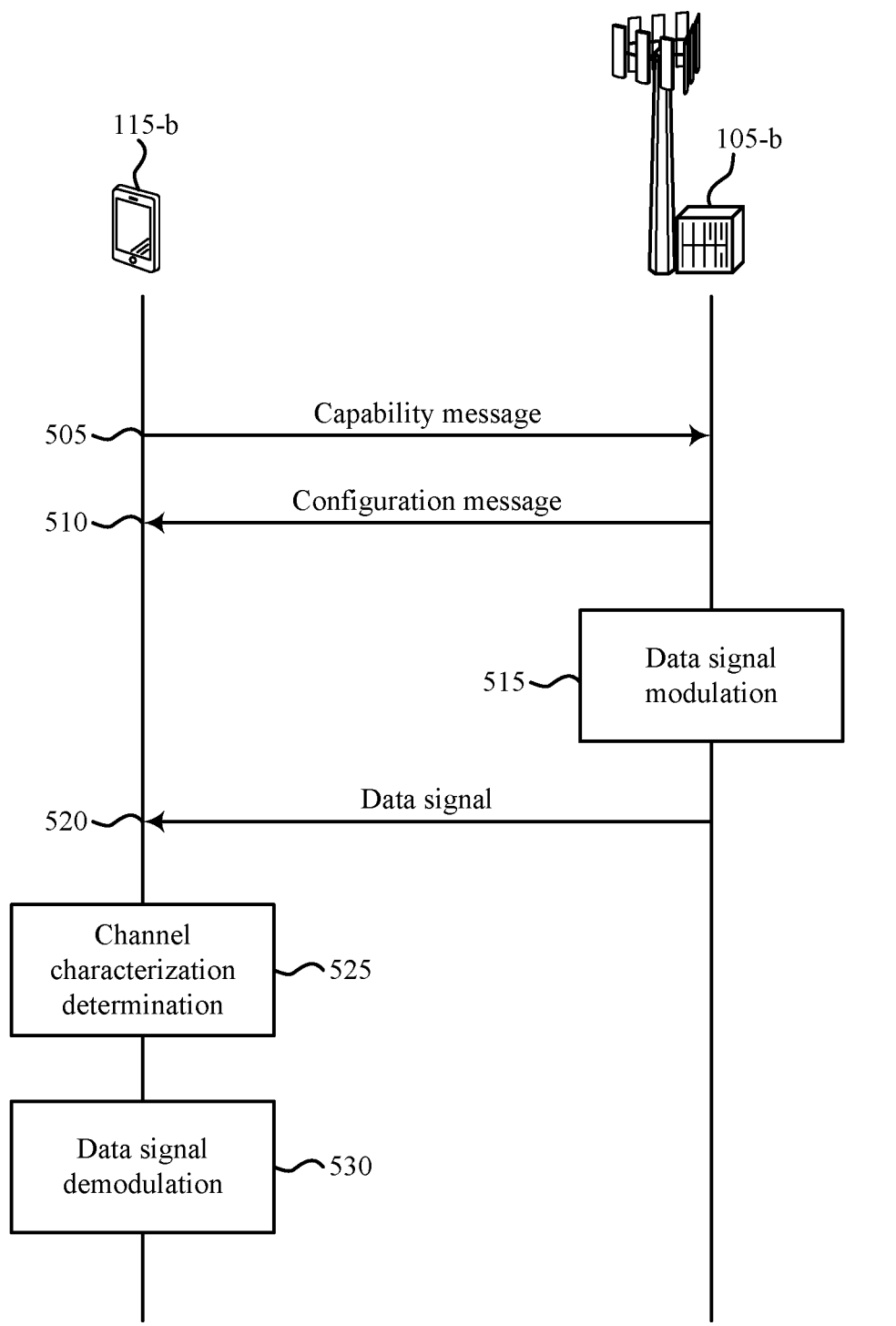
FIG. 5 shows an example of a process flow that supports asymmetric constellations for channel characterization in accordance with one or more aspects of the present disclosure.

FIG. 5 shows an example of a process flow 500 that supports asymmetric constellations for channel characterization in accordance with one or more aspects of the present disclosure. A wireless communication system may include a UE 115-b and a network entity 105-b. The UE 115-b may be an example of the UEs 115 or the UE 115-a, and the network entity 105-b may be an example of the network entities 105 or the network entity 105-a, as described herein.

In the following description of the process flow 500, the operations between the network entity 105-b and the UE 115-b may be transmitted in a different order than the example order shown, or the operations performed by the network entity 105-b and the UE 115-b may be performed in different orders or at different times. Some operations may be omitted from the process flow 500, and other operations may be added to the process flow 500. Further, although some operations or signaling may be shown to occur at different times for discussion purposes, these operations may actually occur at the same time or in overlapping time periods in some examples.

At 505, the UE 115-b may transmit a capability message to the network entity 105-b. For example, the UE 115-b may transmit a capability message indicating a capability of the UE 115-b to support one or more asymmetric modulation constellations as described with reference to FIG. 2.

At 510, the network entity 105-b may transmit a configuration message to the UE 115-b. For example, the network entity 105-b may transmit a message indicating a configuration of an asymmetric modulation constellation for demodulation of a wireless data signal as described with reference to FIG. 2.

At 515, the network entity 105-b may perform data signal modulation. For example, the network entity 105-b may modulate a data signal (e.g., a payload signal) in accordance with an asymmetric modulation constellation for transmission as described with reference to FIG. 2.

At 520, the network entity 105-b may transmit a wireless data signal. For example, network entity 105-b may transmit a wireless data signal including one or more data symbols that are modulated in accordance with the asymmetric modulation constellation as described with reference to FIG. 2.

At 525, the UE 115-b may determine a channel characterization. For instance, the UE 115-b may utilize the received wireless data signal (e.g., the modulated data symbol(s)) to determine a channel characterization (e.g., a phase noise estimate or a channel estimate) as described with reference to FIG. 2.

At 530, the UE 115-b may demodulate the wireless data signal based on the channel characterization. For example, the UE 115-b may demodulate the data symbols of the wireless data signal while compensating for phase noise or channel distortion as described with reference to FIG. 2.

Figure 6:
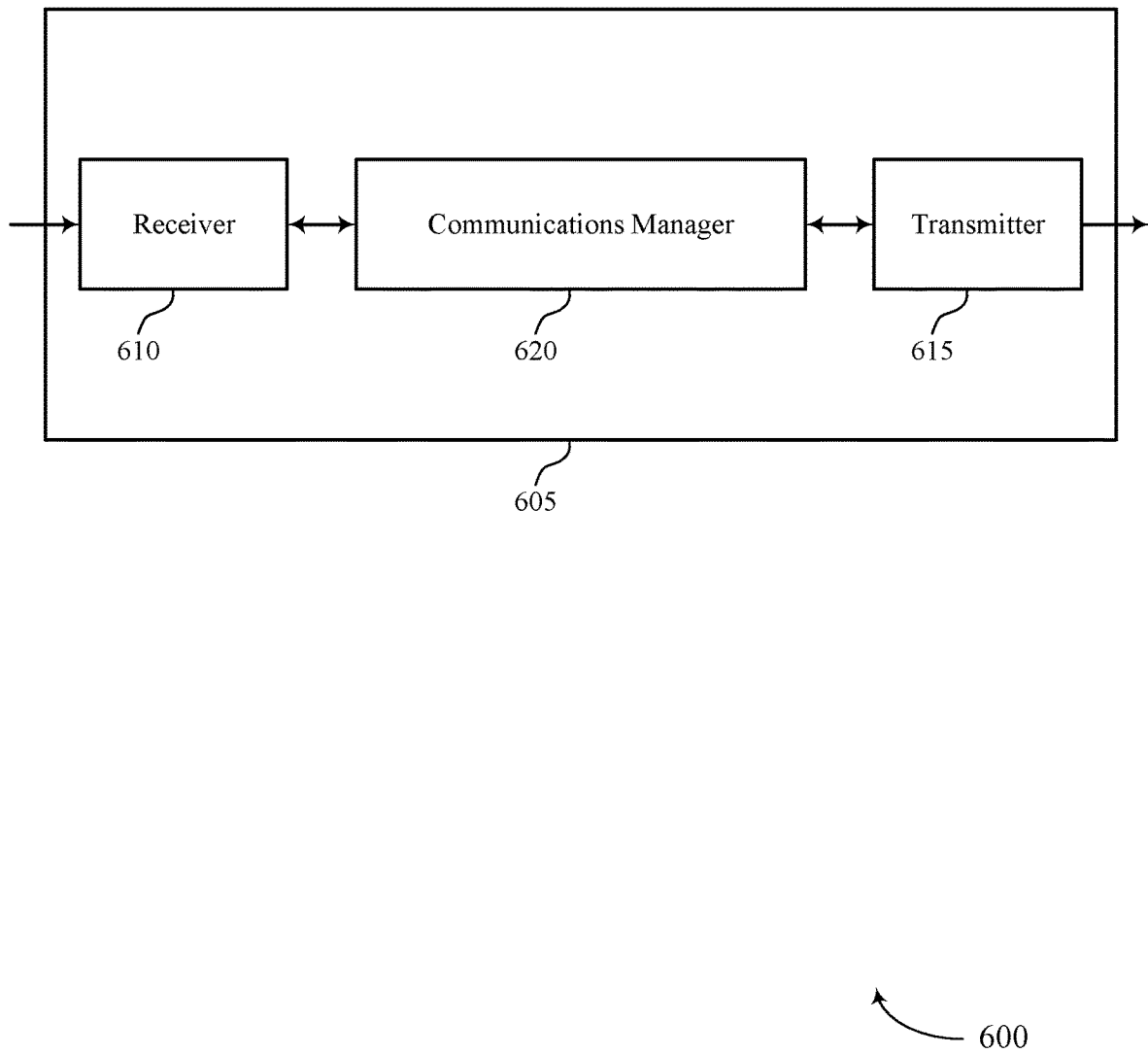
FIGS. 6 and 7 show block diagrams of devices that support asymmetric constellations for channel characterization in accordance with one or more aspects of the present disclosure.

FIG. 6 shows a block diagram 600 of a device 605 that supports asymmetric constellations for channel characterization in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to asymmetric constellations for channel characterization). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to asymmetric constellations for channel characterization). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of asymmetric constellations for channel characterization as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving, from a network entity, a message indicating a configuration of an asymmetric modulation constellation for demodulation of at least one wireless data signal from the network entity. The communications manager 620 is capable of, configured to, or operable to support a means for receiving a wireless data signal from the network entity, the wireless data signal including data symbols modulated in accordance with the asymmetric modulation constellation. The communications manager 620 is capable of, configured to, or operable to support a means for demodulating the data symbols of the wireless data signal based on a channel characterization estimate of the wireless data signal, the channel characterization estimate associated with the configuration of the asymmetric modulation constellation.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing or more efficient utilization of communication resources.

Figure 7:
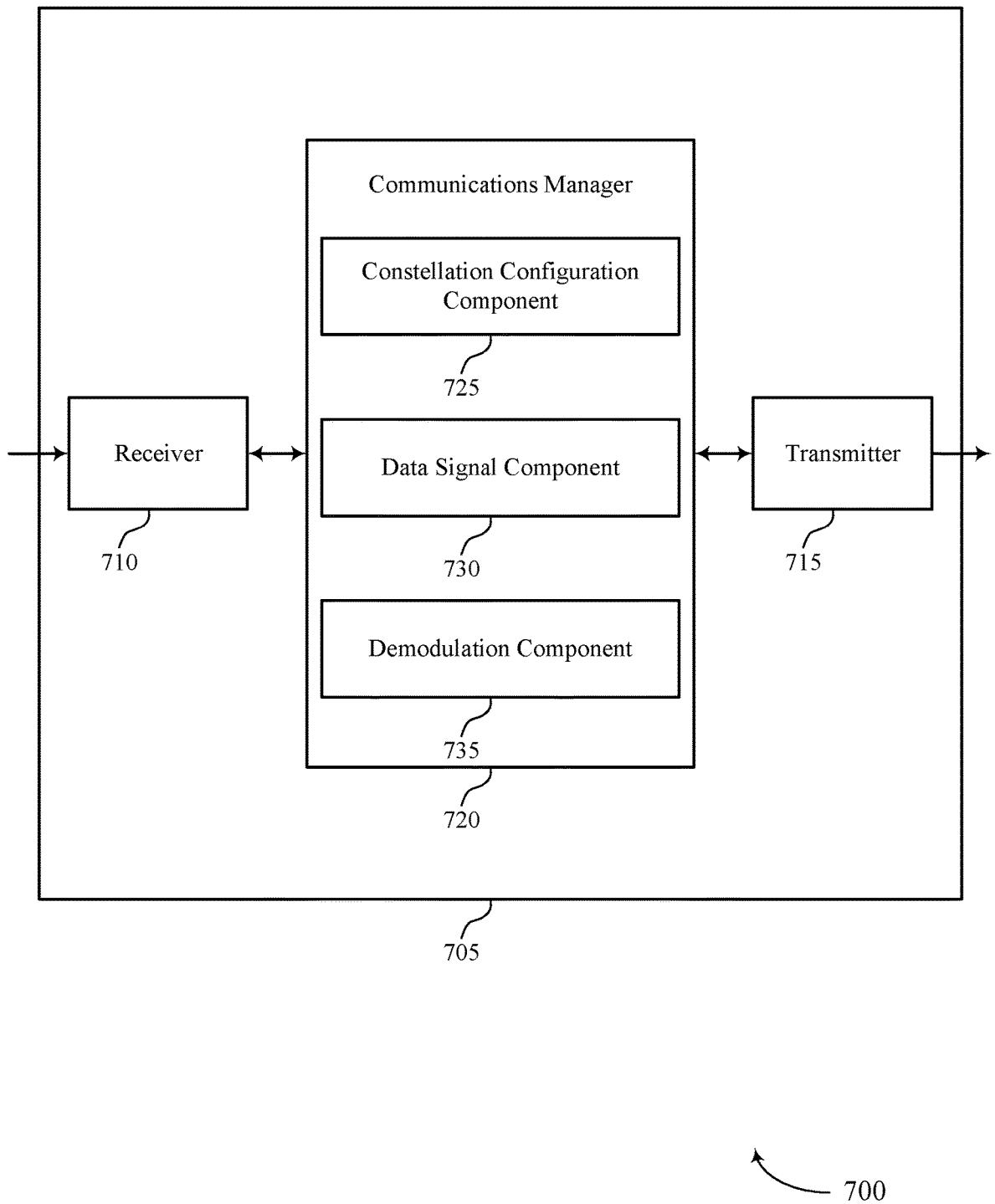

FIG. 7 shows a block diagram 700 of a device 705 that supports asymmetric constellations for channel characterization in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to asymmetric constellations for channel characterization). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to asymmetric constellations for channel characterization). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of asymmetric constellations for channel characterization as described herein. For example, the communications manager 720 may include a constellation configuration component 725, a data signal component 730, a demodulation component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The constellation configuration component 725 is capable of, configured to, or operable to support a means for receiving, from a network entity, a message indicating a configuration of an asymmetric modulation constellation for demodulation of at least one wireless data signal from the network entity. The data signal component 730 is capable of, configured to, or operable to support a means for receiving a wireless data signal from the network entity, the wireless data signal including data symbols modulated in accordance with the asymmetric modulation constellation. The demodulation component 735 is capable of, configured to, or operable to support a means for demodulating the data symbols of the wireless data signal based on a channel characterization estimate of the wireless data signal, the channel characterization estimate associated with the configuration of the asymmetric modulation constellation.

Figure 8:
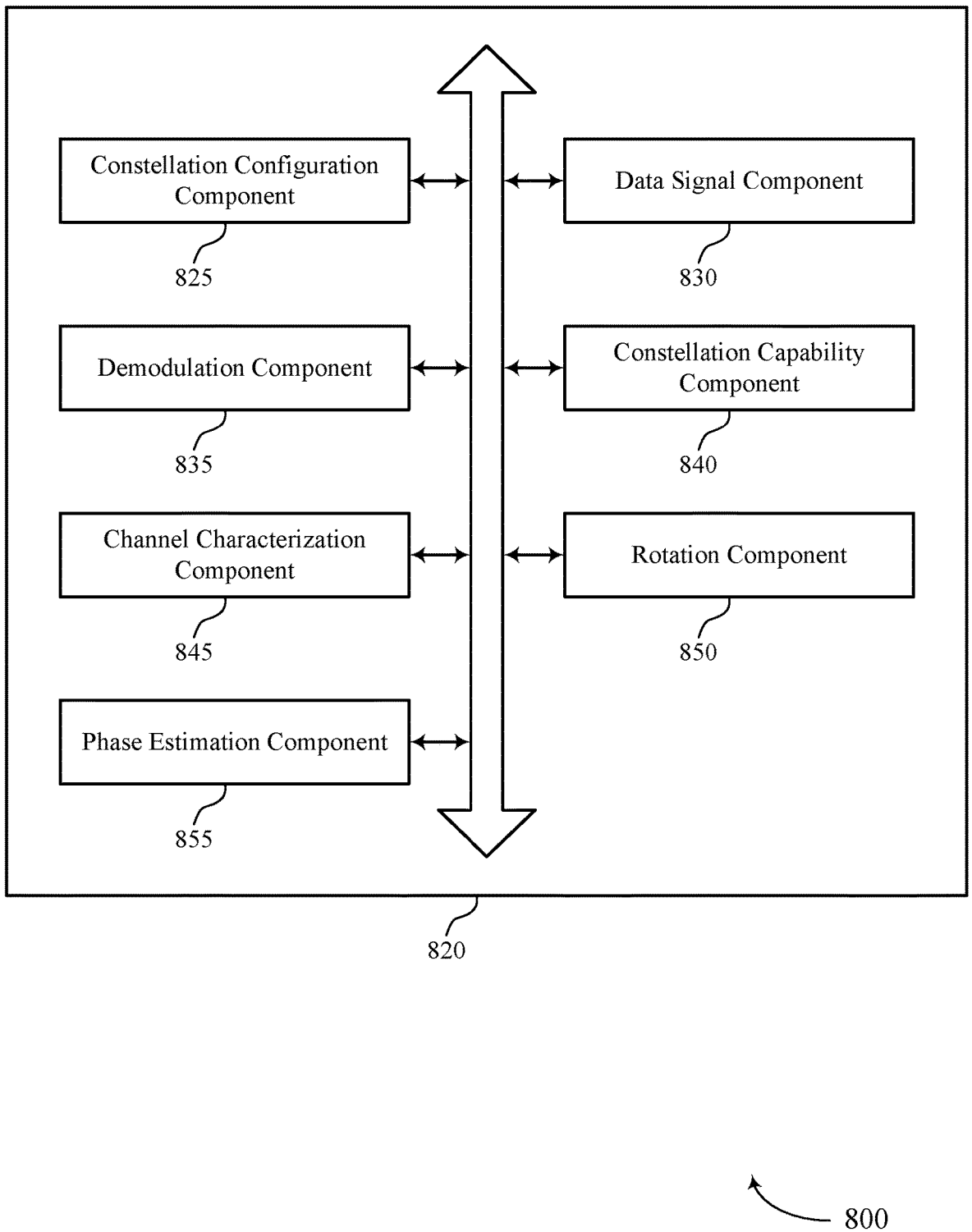
FIG. 8 shows a block diagram of a communications manager that supports asymmetric constellations for channel characterization in accordance with one or more aspects of the present disclosure.

FIG. 8 shows a block diagram 800 of a communications manager 820 that supports asymmetric constellations for channel characterization in accordance with one or more aspects of the present disclosure. The communications manager 820 may be an example of aspects of a communications manager 620, a communications manager 720, or both, as described herein. The communications manager 820, or various components thereof, may be an example of means for performing various aspects of asymmetric constellations for channel characterization as described herein. For example, the communications manager 820 may include a constellation configuration component 825, a data signal component 830, a demodulation component 835, a constellation capability component 840, a channel characterization component 845, a rotation component 850, a phase estimation component 855, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The constellation configuration component 825 is capable of, configured to, or operable to support a means for receiving, from a network entity, a message indicating a configuration of an asymmetric modulation constellation for demodulation of at least one wireless data signal from the network entity. The data signal component 830 is capable of, configured to, or operable to support a means for receiving a wireless data signal from the network entity, the wireless data signal including data symbols modulated in accordance with the asymmetric modulation constellation. The demodulation component 835 is capable of, configured to, or operable to support a means for demodulating the data symbols of the wireless data signal based on a channel characterization estimate of the wireless data signal, the channel characterization estimate associated with the configuration of the asymmetric modulation constellation.

In some examples, the constellation capability component 840 is capable of, configured to, or operable to support a means for transmitting, to the network entity, a capability message indicating a capability of the UE to support asymmetric modulation constellations, where the message indicating the configuration of the asymmetric modulation constellation is received in response to transmitting the capability message.

In some examples, the capability message indicates a capability of the UE to support channel characterization estimation without receiving downlink pilot signaling or with reduced downlink pilot signaling, the reduced downlink pilot signaling including a first amount of pilot signaling received within a timespan or a frequency span that is smaller than a second amount of pilot signaling associated with an absence of the capability of the UE.

In some examples, the channel characterization component 845 is capable of, configured to, or operable to support a means for determining the channel characterization estimate based on the configuration of the asymmetric modulation constellation and at least one data symbol of the data symbols.

In some examples, to support determining the channel characterization estimate, the rotation component 850 is capable of, configured to, or operable to support a means for determining a first rotation section of a first set of rotation sections associated with the at least one data symbol. In some examples, to support determining the channel characterization estimate, the rotation component 850 is capable of, configured to, or operable to support a means for determining a phase rotation within the first rotation section associated with the at least one data symbol. In some examples, to support determining the channel characterization estimate, the rotation component 850 is capable of, configured to, or operable to support a means for determining a second rotation section of a second set of rotation sections that disambiguates the at least one data symbol. In some examples, to support determining the channel characterization estimate, the phase estimation component 855 is capable of, configured to, or operable to support a means for generating a phase noise estimate based on the phase rotation and the second rotation section that disambiguates the at least one data symbol.

In some examples, the channel characterization estimate includes a phase noise estimate, a channel estimate, or a combination thereof.

In some examples, the message is associated with downlink control information indicating a symmetric modulation constellation, the message including an index indicating the asymmetric modulation constellation associated with the symmetric modulation constellation.

In some examples, the constellation configuration component 825 is capable of, configured to, or operable to support a means for determining, based on the index, the asymmetric modulation constellation from a group of asymmetric modulation constellations associated with the symmetric modulation constellation.

In some examples, the message indicating the asymmetric modulation constellation indicates a phase shift to a constellation point of the symmetric modulation constellation.

In some examples, the symmetric modulation constellation is included in a set of symmetric modulation constellations, each symmetric modulation constellation of the set of symmetric modulation constellations associated with a respective asymmetric modulation constellation of a set of asymmetric modulation constellations. In some examples, each respective asymmetric modulation constellation of the set of asymmetric modulation constellations includes a different angular rotation of a respective constellation point relative to at least one other angular rotation of at least one other asymmetric modulation constellation in the set of asymmetric modulation constellations.

In some examples, each asymmetric modulation constellation of the set of asymmetric modulation constellations has a same average power as each associated symmetric modulation constellation of the set of symmetric modulation constellations.

In some examples, the asymmetric modulation constellation is asymmetric with respect to a rotation symmetry of a symmetric modulation constellation associated with the asymmetric modulation constellation.

Figure 9:
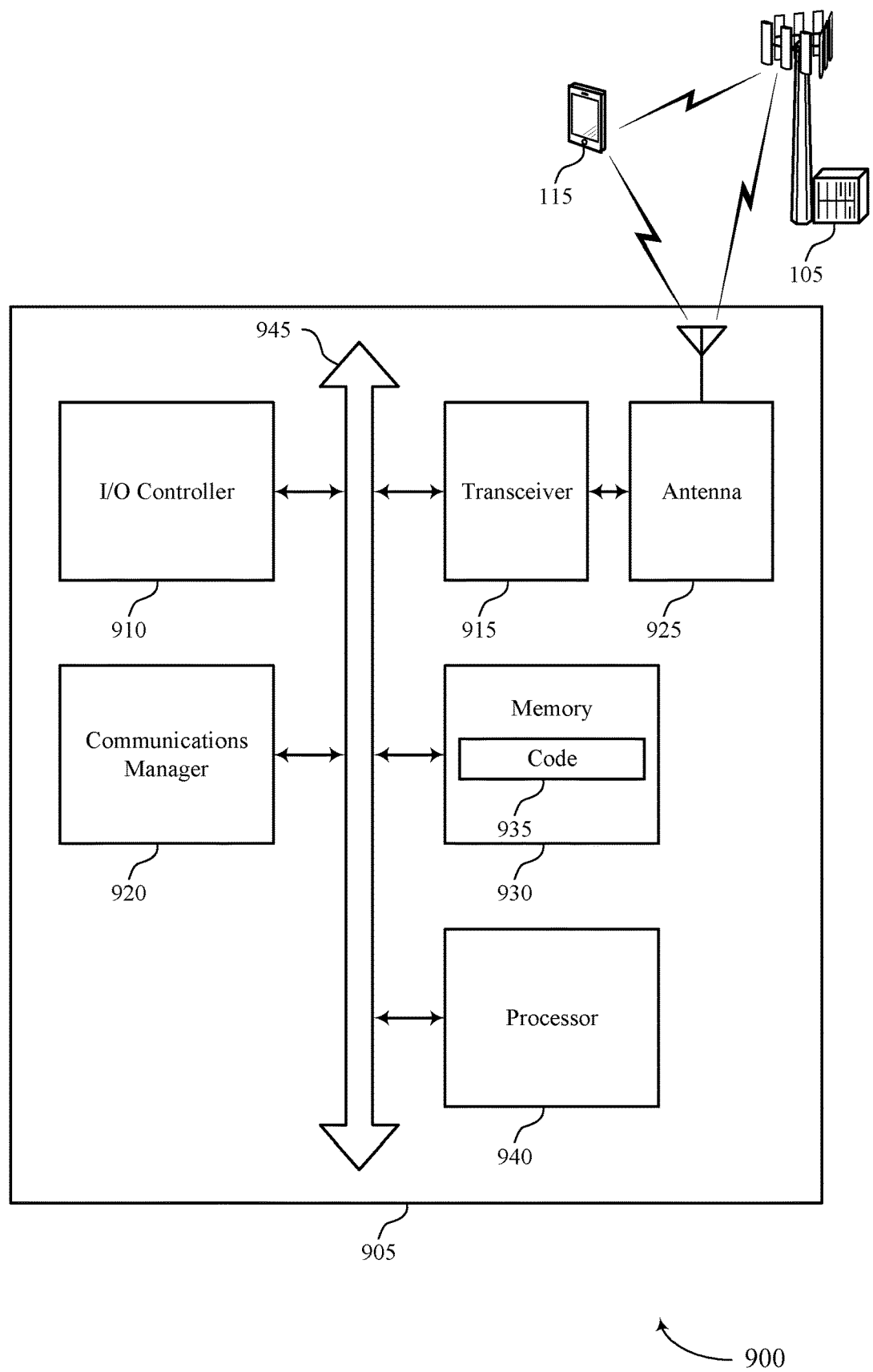
FIG. 9 shows a diagram of a system including a device that supports asymmetric constellations for channel characterization in accordance with one or more aspects of the present disclosure.

FIG. 9 shows a diagram of a system 900 including a device 905 that supports asymmetric constellations for channel characterization in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting asymmetric constellations for channel characterization). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving, from a network entity, a message indicating a configuration of an asymmetric modulation constellation for demodulation of at least one wireless data signal from the network entity. The communications manager 920 is capable of, configured to, or operable to support a means for receiving a wireless data signal from the network entity, the wireless data signal including data symbols modulated in accordance with the asymmetric modulation constellation. The communications manager 920 is capable of, configured to, or operable to support a means for demodulating the data symbols of the wireless data signal based on a channel characterization estimate of the wireless data signal, the channel characterization estimate associated with the configuration of the asymmetric modulation constellation.

By including or configuring the communications manager 920 in accordance with examples as described herein, the device 905 may support techniques for improved communication reliability, reduced latency, more efficient utilization of communication resources, improved coordination between devices, longer battery life, or improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of asymmetric constellations for channel characterization as described herein, or the at least one processor 940 and the at least one memory 930 may be otherwise configured to, individually or collectively, perform or support such operations.

Figure 10:
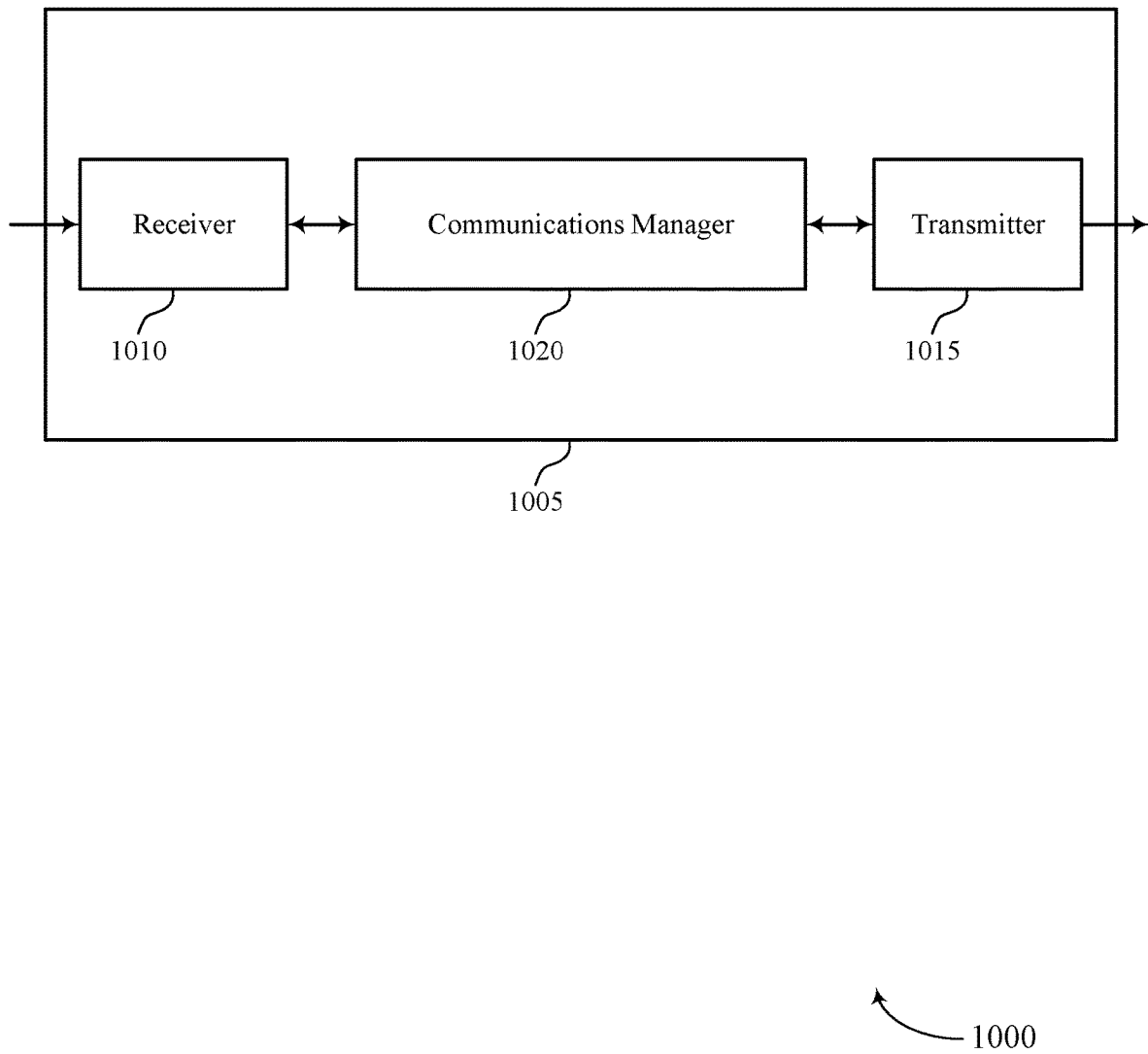
FIGS. 10 and 11 show block diagrams of devices that support asymmetric constellations for channel characterization in accordance with one or more aspects of the present disclosure.

FIG. 10 shows a block diagram 1000 of a device 1005 that supports asymmetric constellations for channel characterization in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of asymmetric constellations for channel characterization as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting, to a UE, a message indicating a configuration of an asymmetric modulation constellation for demodulation of at least one wireless data signal from the network entity. The communications manager 1020 is capable of, configured to, or operable to support a means for modulating data symbols based on the configuration of the asymmetric modulation constellation. The communications manager 1020 is capable of, configured to, or operable to support a means for transmitting a wireless data signal to the UE, the wireless data signal including the data symbols modulated in accordance with the asymmetric modulation constellation.

Figure 11:
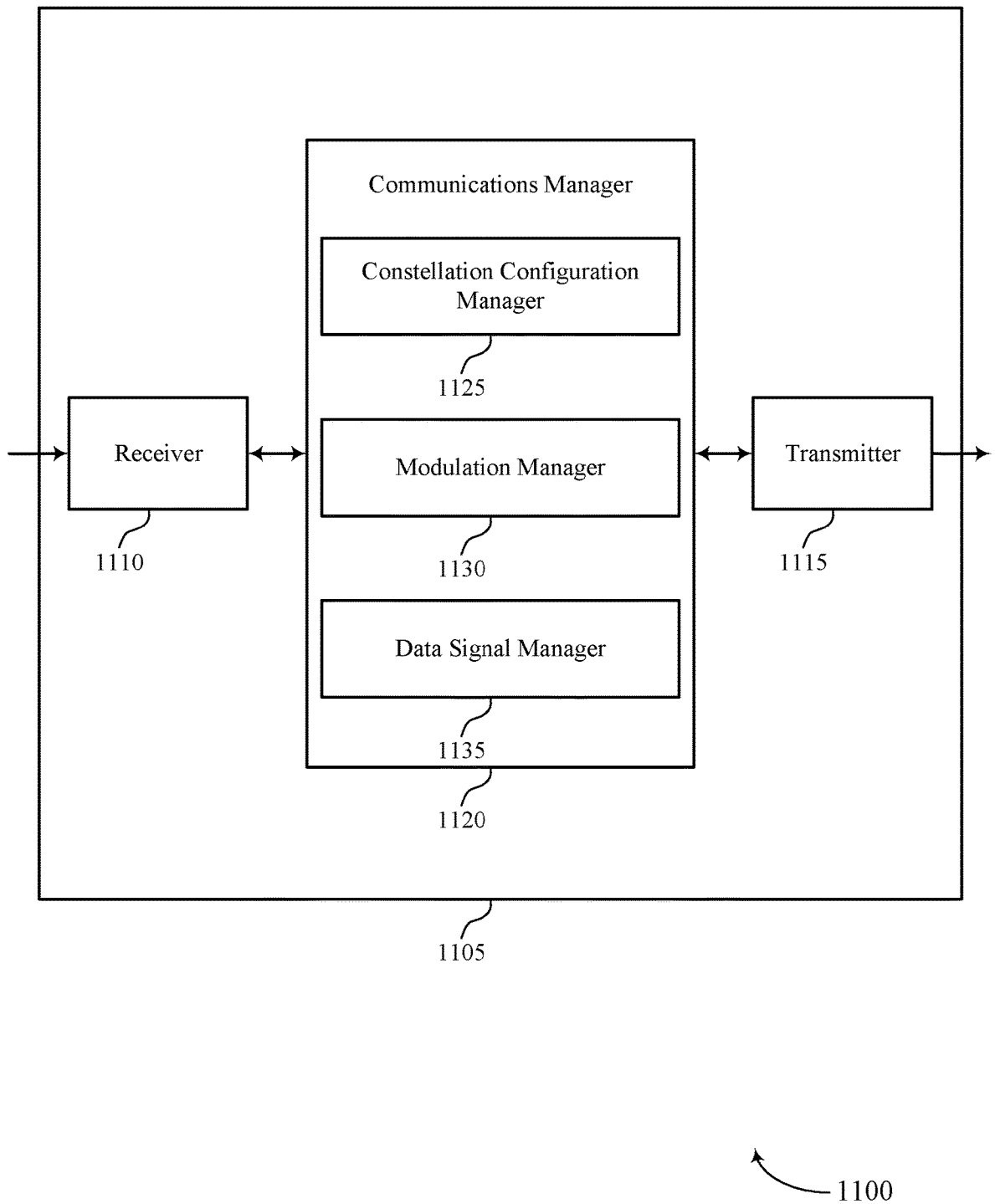

FIG. 11 shows a block diagram 1100 of a device 1105 that supports asymmetric constellations for channel characterization in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of asymmetric constellations for channel characterization as described herein. For example, the communications manager 1120 may include a constellation configuration manager 1125, a modulation manager 1130, a data signal manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The constellation configuration manager 1125 is capable of, configured to, or operable to support a means for transmitting, to a UE, a message indicating a configuration of an asymmetric modulation constellation for demodulation of at least one wireless data signal from the network entity. The modulation manager 1130 is capable of, configured to, or operable to support a means for modulating data symbols based on the configuration of the asymmetric modulation constellation. The data signal manager 1135 is capable of, configured to, or operable to support a means for transmitting a wireless data signal to the UE, the wireless data signal including the data symbols modulated in accordance with the asymmetric modulation constellation.

Figure 12:
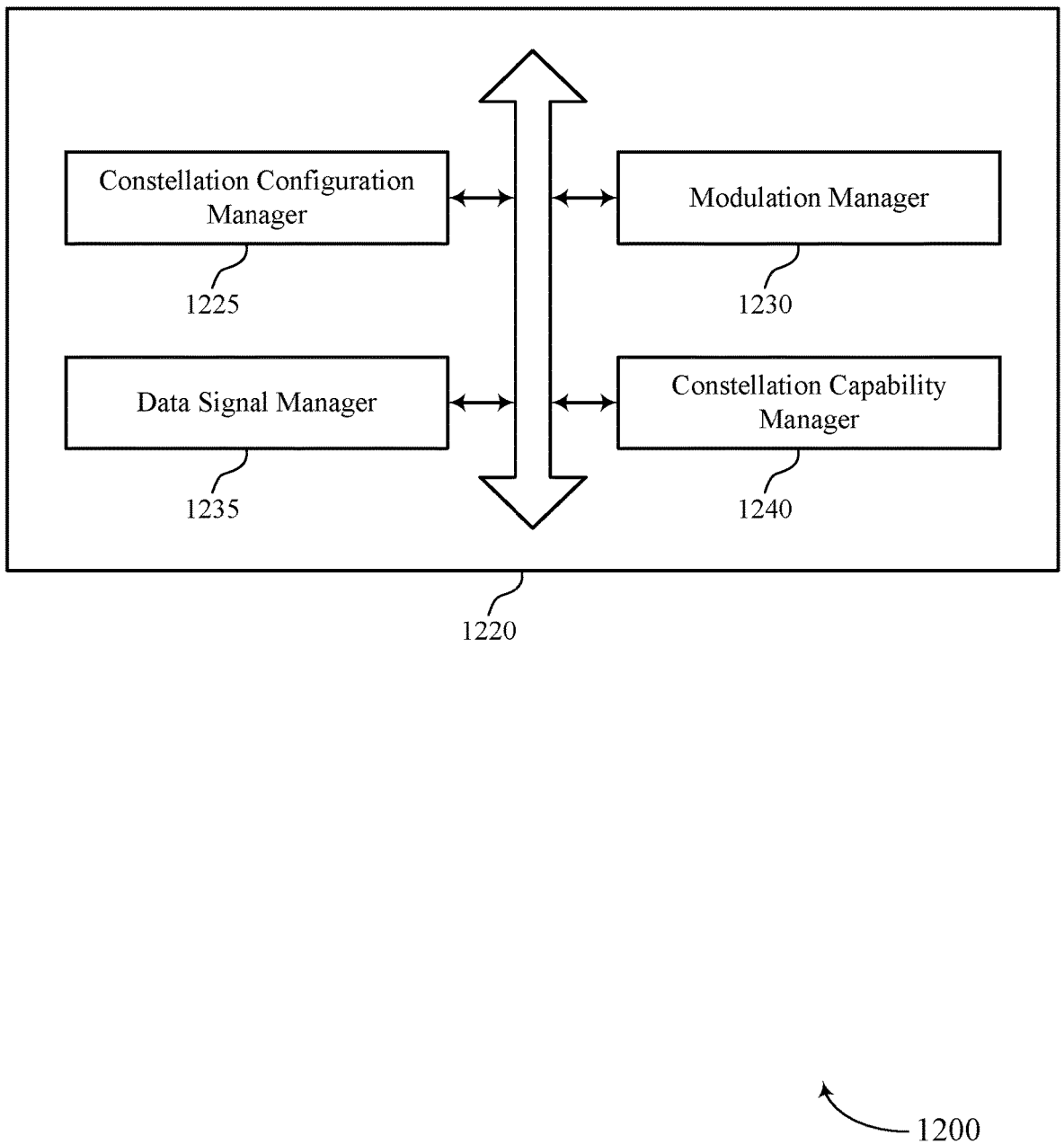
FIG. 12 shows a block diagram of a communications manager that supports asymmetric constellations for channel characterization in accordance with one or more aspects of the present disclosure.

FIG. 12 shows a block diagram 1200 of a communications manager 1220 that supports asymmetric constellations for channel characterization in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of asymmetric constellations for channel characterization as described herein. For example, the communications manager 1220 may include a constellation configuration manager 1225, a modulation manager 1230, a data signal manager 1235, a constellation capability manager 1240, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The constellation configuration manager 1225 is capable of, configured to, or operable to support a means for transmitting, to a UE, a message indicating a configuration of an asymmetric modulation constellation for demodulation of at least one wireless data signal from the network entity. The modulation manager 1230 is capable of, configured to, or operable to support a means for modulating data symbols based on the configuration of the asymmetric modulation constellation. The data signal manager 1235 is capable of, configured to, or operable to support a means for transmitting a wireless data signal to the UE, the wireless data signal including the data symbols modulated in accordance with the asymmetric modulation constellation.

In some examples, the constellation capability manager 1240 is capable of, configured to, or operable to support a means for receiving, from the UE, a capability message indicating a capability of the UE to support asymmetric modulation constellations, where the message indicating the configuration of the asymmetric modulation constellation is transmitted in response to receiving the capability message.

In some examples, the capability message indicates a capability of the UE to support channel characterization estimation without receiving downlink pilot signaling or with reduced downlink pilot signaling, the reduced downlink pilot signaling including a first amount of pilot signaling transmitted within a timespan or a frequency span that is smaller than a second amount of pilot signaling associated with an absence of the capability of the UE.

In some examples, the message is associated with downlink control information indicating a symmetric modulation constellation, the message including an index indicating the asymmetric modulation constellation associated with the symmetric modulation constellation.

In some examples, the message indicating the asymmetric modulation constellation indicates a phase shift to a constellation point of the symmetric modulation constellation.

In some examples, the symmetric modulation constellation is included in a set of symmetric modulation constellations, each symmetric modulation constellation of the set of symmetric modulation constellations associated with a respective asymmetric modulation constellation of a set of asymmetric modulation constellations. In some examples, each respective asymmetric modulation constellation of the set of asymmetric modulation constellations includes a different angular rotation of a respective constellation point relative to at least one other angular rotation of at least one other asymmetric modulation constellation in the set of asymmetric modulation constellations.

In some examples, each asymmetric modulation constellation of the set of asymmetric modulation constellations has a same average power as each associated symmetric modulation constellation of the set of symmetric modulation constellations.

In some examples, the asymmetric modulation constellation is asymmetric with respect to a rotation symmetry of a symmetric modulation constellation associated with the asymmetric modulation constellation.

Figure 13:
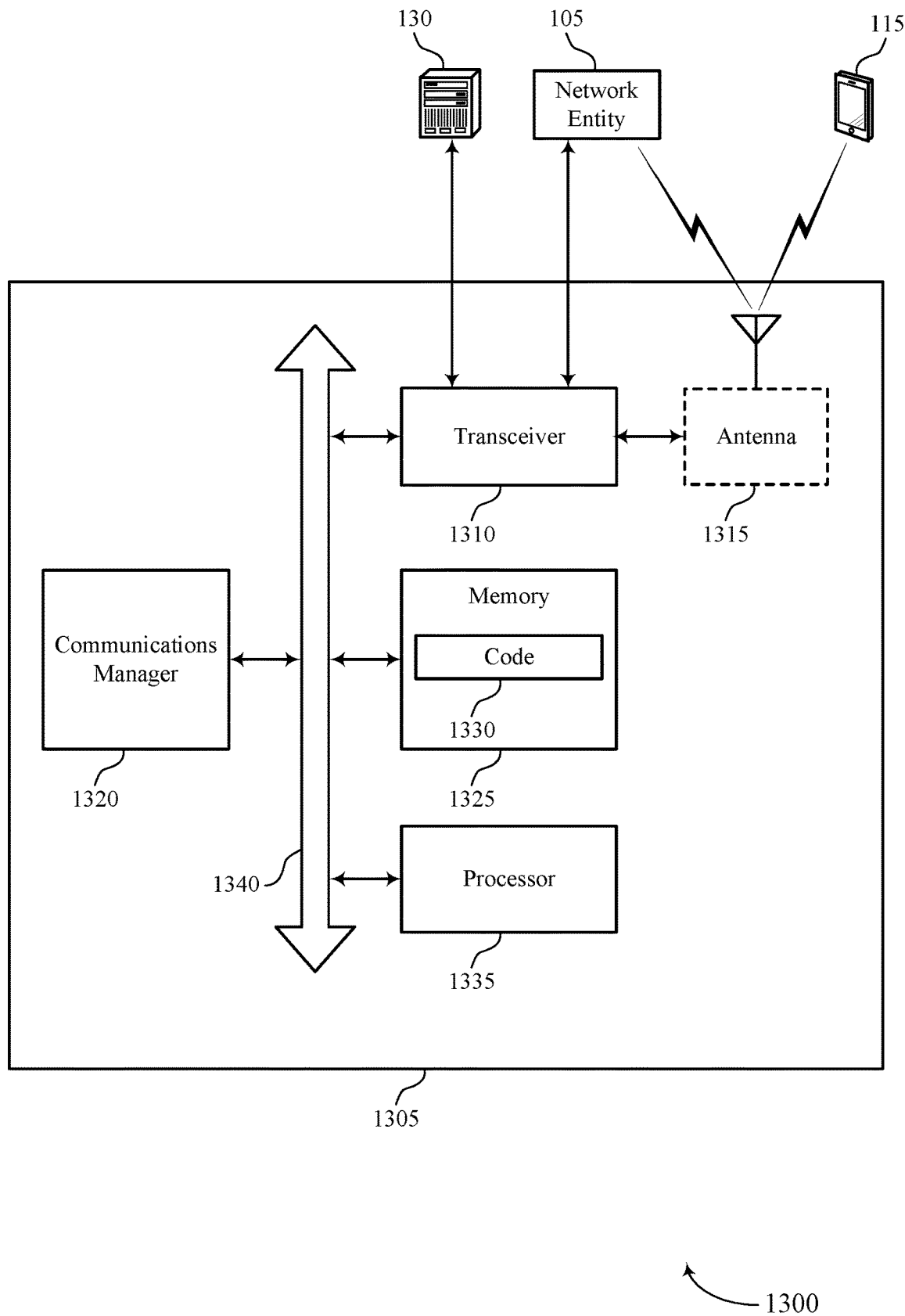
FIG. 13 shows a diagram of a system including a device that supports asymmetric constellations for channel characterization in accordance with one or more aspects of the present disclosure.

FIG. 13 shows a diagram of a system 1300 including a device 1305 that supports asymmetric constellations for channel characterization in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications using one or more wired interfaces, using one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting asymmetric constellations for channel characterization). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. As such, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting, to a UE, a message indicating a configuration of an asymmetric modulation constellation for demodulation of at least one wireless data signal from the network entity. The communications manager 1320 is capable of, configured to, or operable to support a means for modulating data symbols based on the configuration of the asymmetric modulation constellation. The communications manager 1320 is capable of, configured to, or operable to support a means for transmitting a wireless data signal to the UE, the wireless data signal including the data symbols modulated in accordance with the asymmetric modulation constellation.

By including or configuring the communications manager 1320 in accordance with examples as described herein, the device 1305 may support techniques for improved communication reliability, reduced latency, more efficient utilization of communication resources, improved coordination between devices, or improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of asymmetric constellations for channel characterization as described herein, or the at least one processor 1335 and the at least one memory 1325 may be otherwise configured to, individually or collectively, perform or support such operations.

Figure 14:
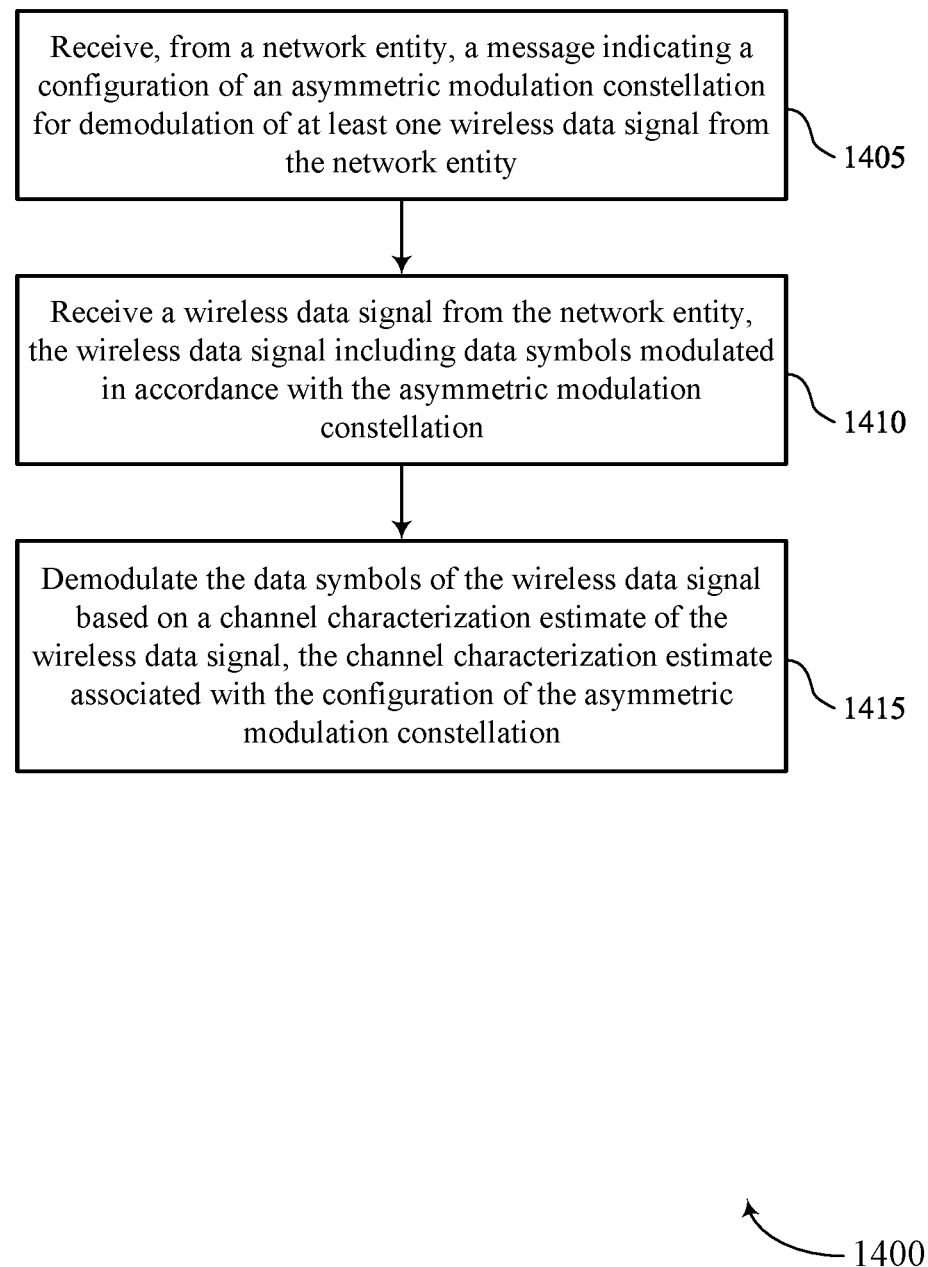
FIGS. 14 through 17 show flowcharts illustrating methods that support asymmetric constellations for channel characterization in accordance with one or more aspects of the present disclosure.

FIG. 14 shows a flowchart illustrating a method 1400 that supports asymmetric constellations for channel characterization in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, a message indicating a configuration of an asymmetric modulation constellation for demodulation of at least one wireless data signal from the network entity. The operations of block 1405 may be performed in accordance with examples as disclosed herein. In some examples, aspects of the operations of 1405 may be performed by a constellation configuration component 825 as described with reference to FIG. 8.

At 1410, the method may include receiving a wireless data signal from the network entity, the wireless data signal including data symbols modulated in accordance with the asymmetric modulation constellation. The operations of block 1410 may be performed in accordance with examples as disclosed herein. In some examples, aspects of the operations of 1410 may be performed by a data signal component 830 as described with reference to FIG. 8.

At 1415, the method may include demodulating the data symbols of the wireless data signal based on a channel characterization estimate of the wireless data signal, the channel characterization estimate associated with the configuration of the asymmetric modulation constellation. The operations of block 1415 may be performed in accordance with examples as disclosed herein. In some examples, aspects of the operations of 1415 may be performed by a demodulation component 835 as described with reference to FIG. 8.

Figure 15:
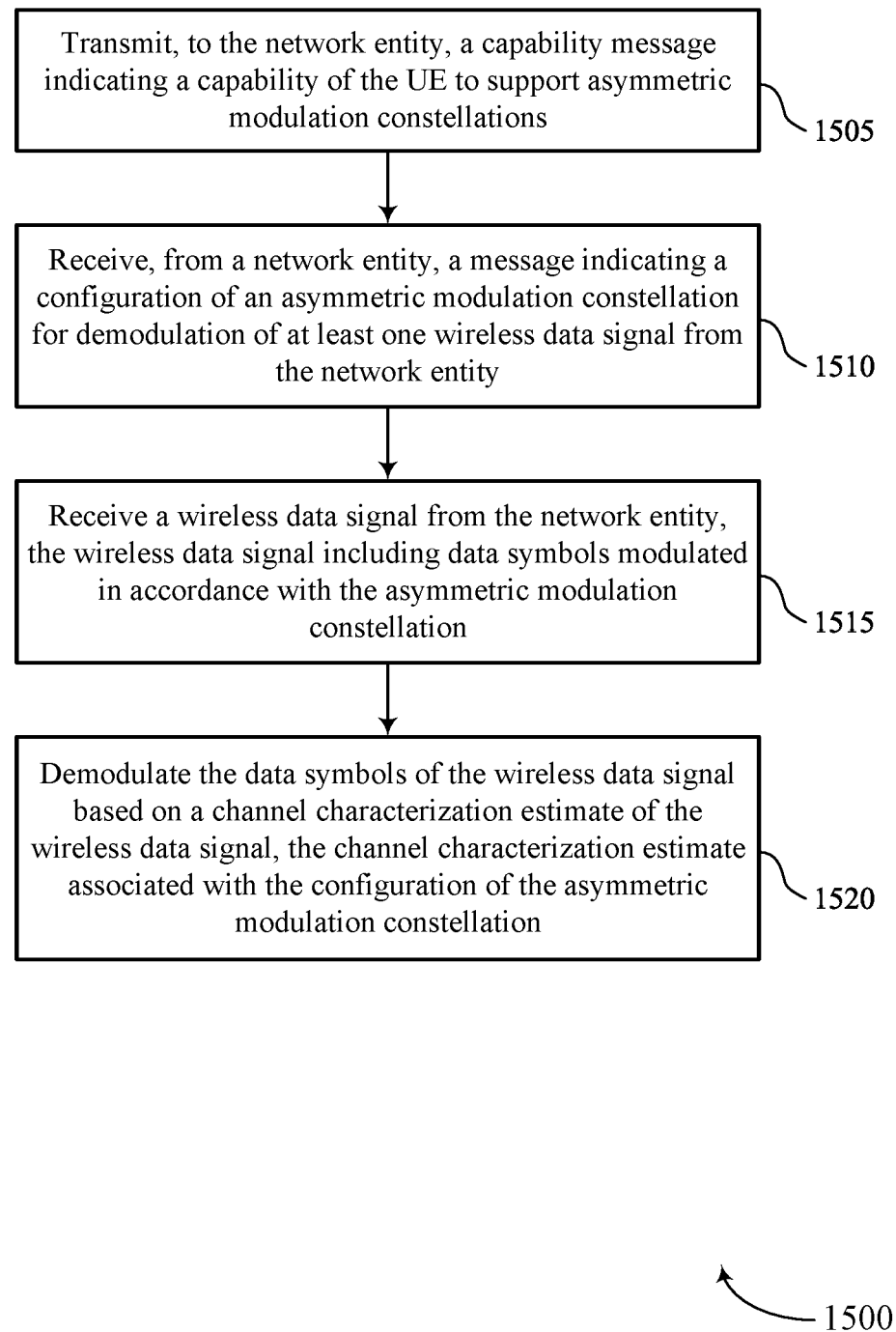

FIG. 15 shows a flowchart illustrating a method 1500 that supports asymmetric constellations for channel characterization in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting, to the network entity, a capability message indicating a capability of the UE to support asymmetric modulation constellations, where the message indicating the configuration of the asymmetric modulation constellation is received in response to transmitting the capability message. The operations of block 1505 may be performed in accordance with examples as disclosed herein. In some examples, aspects of the operations of 1505 may be performed by a constellation capability component 840 as described with reference to FIG. 8.

At 1510, the method may include receiving, from a network entity, a message indicating a configuration of an asymmetric modulation constellation for demodulation of at least one wireless data signal from the network entity. The message indicating the configuration of the asymmetric modulation constellation may be received in response to transmitting the capability message. The operations of block 1510 may be performed in accordance with examples as disclosed herein. In some examples, aspects of the operations of 1510 may be performed by a constellation configuration component 825 as described with reference to FIG. 8.

At 1515, the method may include receiving a wireless data signal from the network entity, the wireless data signal including data symbols modulated in accordance with the asymmetric modulation constellation. The operations of block 1515 may be performed in accordance with examples as disclosed herein. In some examples, aspects of the operations of 1515 may be performed by a data signal component 830 as described with reference to FIG. 8.

At 1520, the method may include demodulating the data symbols of the wireless data signal based on a channel characterization estimate of the wireless data signal, the channel characterization estimate associated with the configuration of the asymmetric modulation constellation. The operations of block 1520 may be performed in accordance with examples as disclosed herein. In some examples, aspects of the operations of 1520 may be performed by a demodulation component 835 as described with reference to FIG. 8.

Figure 16:
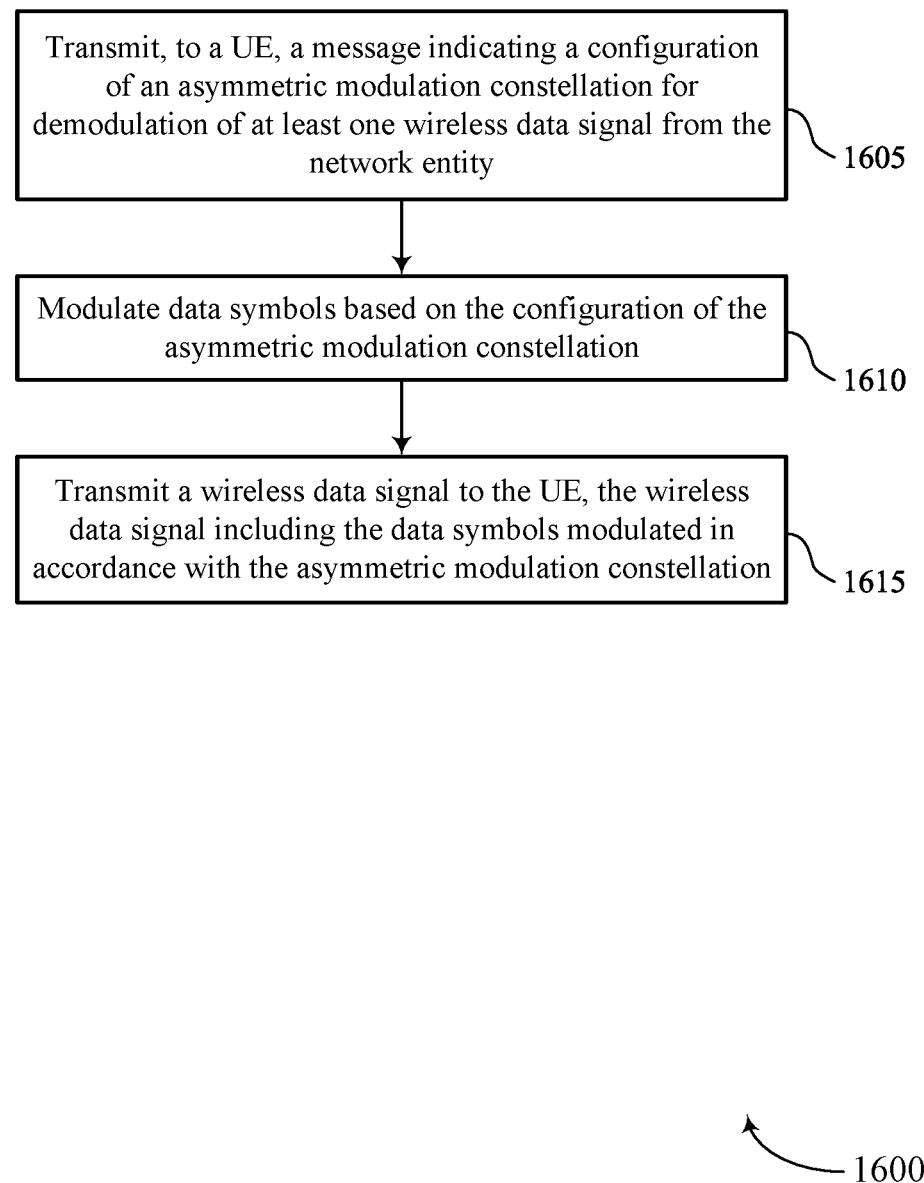

FIG. 16 shows a flowchart illustrating a method 1600 that supports asymmetric constellations for channel characterization in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, a message indicating a configuration of an asymmetric modulation constellation for demodulation of at least one wireless data signal from the network entity. The operations of block 1605 may be performed in accordance with examples as disclosed herein. In some examples, aspects of the operations of 1605 may be performed by a constellation configuration manager 1225 as described with reference to FIG. 12.

At 1610, the method may include modulating data symbols based on the configuration of the asymmetric modulation constellation. The operations of block 1610 may be performed in accordance with examples as disclosed herein. In some examples, aspects of the operations of 1610 may be performed by a modulation manager 1230 as described with reference to FIG. 12.

At 1615, the method may include transmitting a wireless data signal to the UE, the wireless data signal including the data symbols modulated in accordance with the asymmetric modulation constellation. The operations of block 1615 may be performed in accordance with examples as disclosed herein. In some examples, aspects of the operations of 1615 may be performed by a data signal manager 1235 as described with reference to FIG. 12.

Figure 17:
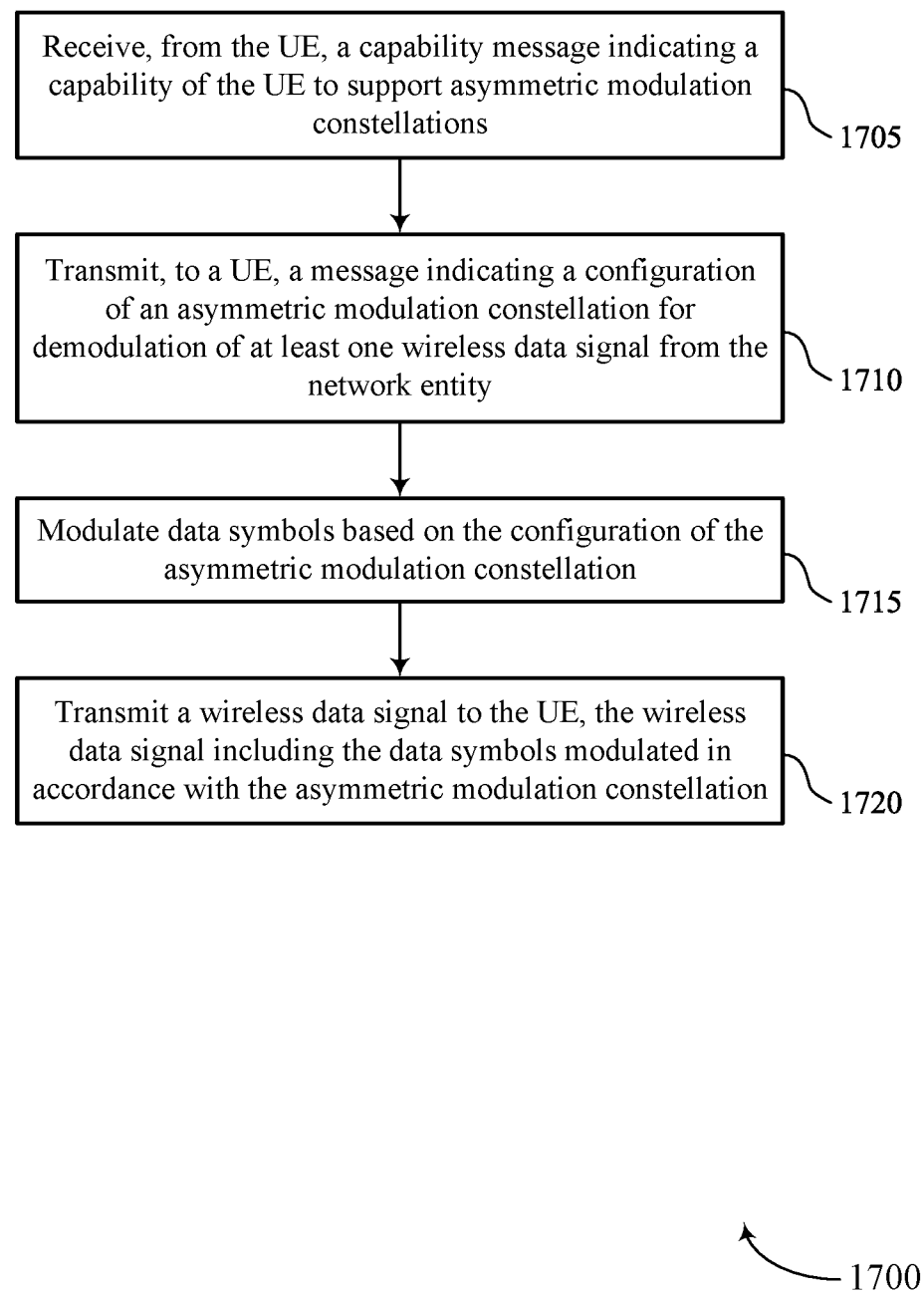

FIG. 17 shows a flowchart illustrating a method 1700 that supports asymmetric constellations for channel characterization in accordance with aspects of the present disclosure.

The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from the UE, a capability message indicating a capability of the UE to support asymmetric modulation constellations, where the message indicating the configuration of the asymmetric modulation constellation is transmitted in response to receiving the capability message. The operations of block 1705 may be performed in accordance with examples as disclosed herein. In some examples, aspects of the operations of 1705 may be performed by a constellation capability manager 1240 as described with reference to FIG. 12.

At 1710, the method may include transmitting, to a UE, a message indicating a configuration of an asymmetric modulation constellation for demodulation of at least one wireless data signal from the network entity. The message indicating the configuration of the asymmetric modulation constellation may be transmitted in response to receiving the capability message. The operations of block 1710 may be performed in accordance with examples as disclosed herein. In some examples, aspects of the operations of 1710 may be performed by a constellation configuration manager 1225 as described with reference to FIG. 12.

At 1715, the method may include modulating data symbols based on the configuration of the asymmetric modulation constellation. The operations of block 1715 may be performed in accordance with examples as disclosed herein. In some examples, aspects of the operations of 1715 may be performed by a modulation manager 1230 as described with reference to FIG. 12.

At 1720, the method may include transmitting a wireless data signal to the UE, the wireless data signal including the data symbols modulated in accordance with the asymmetric modulation constellation. The operations of block 1720 may be performed in accordance with examples as disclosed herein. In some examples, aspects of the operations of 1720 may be performed by a data signal manager 1235 as described with reference to FIG. 12.

The following provides an overview of aspects of the present disclosure:

Aspect 1: A method for wireless communications by a UE, comprising: receiving, from a network entity, a message indicating a configuration of an asymmetric modulation constellation for demodulation of at least one wireless data signal from the network entity; receiving a wireless data signal from the network entity, the wireless data signal comprising data symbols modulated in accordance with the asymmetric modulation constellation; and demodulating the data symbols of the wireless data signal based at least in part on a channel characterization estimate of the wireless data signal, the channel characterization estimate associated with the configuration of the asymmetric modulation constellation.

Aspect 2: The method of aspect 1, further comprising: transmitting, to the network entity, a capability message indicating a capability of the UE to support asymmetric modulation constellations, where the message indicating the configuration of the asymmetric modulation constellation is received in response to transmitting the capability message.

Aspect 3: The method of aspect 2, wherein the capability message indicates a capability of the UE to support channel characterization estimation without receiving downlink pilot signaling or with reduced downlink pilot signaling, the reduced downlink pilot signaling comprising a first amount of pilot signaling received within a timespan or a frequency span that is smaller than a second amount of pilot signaling associated with an absence of the capability of the UE.

Aspect 4: The method of any of aspects 1 through 3, further comprising: determining the channel characterization estimate based at least in part on the configuration of the asymmetric modulation constellation and at least one data symbol of the data symbols.

Aspect 5: The method of aspect 4, wherein determining the channel characterization estimate comprises: determining a first rotation section of a first set of rotation sections associated with the at least one data symbol; determining a phase rotation within the first rotation section associated with the at least one data symbol; and determining a second rotation section of a second set of rotation sections that disambiguates the at least one data symbol; and generating a phase noise estimate based at least in part on the phase rotation and the second rotation section that disambiguates the at least one data symbol.

Aspect 6: The method of any of aspects 1 through 5, wherein the channel characterization estimate comprises a phase noise estimate, a channel estimate, or a combination thereof.

Aspect 7: The method of any of aspects 1 through 6, wherein the message is associated with downlink control information indicating a symmetric modulation constellation, the message comprising an index indicating the asymmetric modulation constellation associated with the symmetric modulation constellation.

Aspect 8: The method of aspect 7, further comprising: determining, based at least in part on the index, the asymmetric modulation constellation from a group of asymmetric modulation constellations associated with the symmetric modulation constellation.

Aspect 9: The method of any of aspects 7 through 8, wherein the message indicating the asymmetric modulation constellation indicates a phase shift to a constellation point of the symmetric modulation constellation.

Aspect 10: The method of any of aspects 7 through 9, wherein the symmetric modulation constellation is included in a set of symmetric modulation constellations, each symmetric modulation constellation of the set of symmetric modulation constellations associated with a respective asymmetric modulation constellation of a set of asymmetric modulation constellations, each respective asymmetric modulation constellation of the set of asymmetric modulation constellations includes a different angular rotation of a respective constellation point relative to at least one other angular rotation of at least one other asymmetric modulation constellation in the set of asymmetric modulation constellations.

Aspect 11: The method of aspect 10, wherein each asymmetric modulation constellation of the set of asymmetric modulation constellations has a same average power as each associated symmetric modulation constellation of the set of symmetric modulation constellations.

Aspect 12: The method of any of aspects 1 through 11, wherein the asymmetric modulation constellation is asymmetric with respect to a rotation symmetry of a symmetric modulation constellation associated with the asymmetric modulation constellation.

Aspect 13: A method for wireless communications by a network entity, comprising: transmitting, to a UE, a message indicating a configuration of an asymmetric modulation constellation for demodulation of at least one wireless data signal from the network entity; modulating data symbols based at least in part on the configuration of the asymmetric modulation constellation; and transmitting a wireless data signal to the UE, the wireless data signal comprising the data symbols modulated in accordance with the asymmetric modulation constellation.

Aspect 14: The method of aspect 13, further comprising: receiving, from the UE, a capability message indicating a capability of the UE to support asymmetric modulation constellations, where the message indicating the configuration of the asymmetric modulation constellation is transmitted in response to receiving the capability message.

Aspect 15: The method of aspect 14, wherein the capability message indicates a capability of the UE to support channel characterization estimation without receiving downlink pilot signaling or with reduced downlink pilot signaling, the reduced downlink pilot signaling comprising a first amount of pilot signaling transmitted within a timespan or a frequency span that is smaller than a second amount of pilot signaling associated with an absence of the capability of the UE.

Aspect 16: The method of any of aspects 13 through 15, wherein the message is associated with downlink control information indicating a symmetric modulation constellation, the message comprising an index indicating the asymmetric modulation constellation associated with the symmetric modulation constellation.

Aspect 17: The method of aspect 16, wherein the message indicating the asymmetric modulation constellation indicates a phase shift to a constellation point of the symmetric modulation constellation.

Aspect 18: The method of any of aspects 16 through 17, wherein the symmetric modulation constellation is included in a set of symmetric modulation constellations, each symmetric modulation constellation of the set of symmetric modulation constellations associated with a respective asymmetric modulation constellation of a set of asymmetric modulation constellations, each respective asymmetric modulation constellation of the set of asymmetric modulation constellations includes a different angular rotation of a respective constellation point relative to at least one other angular rotation of at least one other asymmetric modulation constellation in the set of asymmetric modulation constellations.

Aspect 19: The method of aspect 18, wherein each asymmetric modulation constellation of the set of asymmetric modulation constellations has a same average power as each associated symmetric modulation constellation of the set of symmetric modulation constellations.

Aspect 20: The method of any of aspects 13 through 19, wherein the asymmetric modulation constellation is asymmetric with respect to a rotation symmetry of a symmetric modulation constellation associated with the asymmetric modulation constellation.

Aspect 21: A UE for wireless communications, comprising one or more memories storing processor-executable code, and one or more processors coupled with the one or more memories and individually or collectively operable to execute the code to cause the UE to perform a method of any of aspects 1 through 12.

Aspect 22: A UE for wireless communications, comprising at least one means for performing a method of any of aspects 1 through 12.

Aspect 23: A non-transitory computer-readable medium storing code for wireless communications, the code comprising instructions executable by a processor to perform a method of any of aspects 1 through 12.

Aspect 24: A network entity for wireless communications, comprising one or more memories storing processor-executable code, and one or more processors coupled with the one or more memories and individually or collectively operable to execute the code to cause the network entity to perform a method of any of aspects 13 through 20.

Aspect 25: A network entity for wireless communications, comprising at least one means for performing a method of any of aspects 13 through 20.

Aspect 26: A non-transitory computer-readable medium storing code for wireless communications, the code comprising instructions executable by a processor to perform a method of any of aspects 13 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a"

using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components." Also, as used herein, the phrase "a set" shall be construed as including the possibility of a set with one member. That is, the phrase "a set" shall be construed in the same manner as "one or more."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
    one or more memories storing processor-executable code; and
    one or more processors coupled with the one or more memories and individually or collectively operable to execute the code to cause the UE to:
        receive, from a network entity, a message indicating a configuration of an asymmetric modulation for demodulation of at least one wireless data signal from the network entity;
        receive a wireless data signal from the network entity, the wireless data signal comprising data symbols modulated in accordance with the asymmetric modulation constellation; and
        demodulate the data symbols of the wireless data signal based at least in part on a channel characterization estimate of the wireless data signal, the channel characterization estimate associated with the configuration of the asymmetric modulation constellation.

2. The UE of claim 1, wherein the one or more processors are individually or collectively further operable to execute the code to cause the UE to:
    transmit, to the network entity, a capability message indicating a capability of the UE to support asymmetric modulation constellations, wherein the message indicating the configuration of the asymmetric modulation constellation is received in response to transmitting the capability message.

3. The UE of claim 2, wherein the capability message indicates a capability of the UE to support channel characterization estimation without receiving downlink pilot signaling or with reduced downlink pilot signaling, the reduced downlink pilot signaling comprising a first amount of pilot signaling received within a timespan or a frequency span that is smaller than a second amount of pilot signaling associated with an absence of the capability of the UE.

4. The UE of claim 1, wherein the one or more processors are individually or collectively further operable to execute the code to cause the UE to:
    determine the channel characterization estimate based at least in part on the configuration of the asymmetric modulation constellation and at least one data symbol of the data symbols.

5. The UE of claim 4, wherein, to determine the channel characterization estimate, the one or more processors are individually or collectively operable to execute the code to cause the UE to:
    determine a first rotation section of a first set of rotation sections associated with the at least one data symbol;
    determine a phase rotation within the first rotation section associated with the at least one data symbol;
    determine a second rotation section of a second set of rotation sections that disambiguates the at least one data symbol; and
    generate a phase noise estimate based at least in part on the phase rotation and the second rotation section that disambiguates the at least one data symbol.

6. The UE of claim 1, wherein the channel characterization estimate comprises a phase noise estimate, a channel estimate, or a combination thereof.

7. The UE of claim 1, wherein the message is associated with downlink control information indicating a symmetric modulation constellation, the message comprising an index indicating the asymmetric modulation constellation associated with the symmetric modulation constellation.

8. The UE of claim 7, wherein the one or more processors are individually or collectively further operable to execute the code to cause the UE to:
    determine, based at least in part on the index, the asymmetric modulation constellation from a group of asymmetric modulation constellations associated with the symmetric modulation constellation.

9. The UE of claim 7, wherein the message indicating the asymmetric modulation constellation indicates a phase shift to a constellation point of the symmetric modulation constellation.

10. The UE of claim 7, wherein:
the symmetric modulation constellation is included in a set of symmetric modulation constellations, each symmetric modulation constellation of the set of symmetric modulation constellations associated with a respective asymmetric modulation constellation of a set of asymmetric modulation constellations, and
each respective asymmetric modulation constellation of the set of asymmetric modulation constellations includes a different angular rotation of a respective constellation point relative to at least one other angular rotation of at least one other asymmetric modulation constellation in the set of asymmetric modulation constellations.

11. The UE of claim 10, wherein each asymmetric modulation constellation of the set of asymmetric modulation constellations has a same average power as each associated symmetric modulation constellation of the set of symmetric modulation constellations.

12. The UE of claim 1, wherein the asymmetric modulation constellation is asymmetric with respect to a rotation symmetry of a symmetric modulation constellation associated with the asymmetric modulation constellation.

13. A network entity, comprising:
one or more memories storing processor-executable code; and
one or more processors coupled with the one or more memories and individually or collectively operable to execute the code to cause the network entity to:
receive, from a user equipment (UE), a capability message indicating a capability of the UE to support asymmetric modulation constellations;
transmit, to the UE, in response to receiving the capability message, a message indicating a configuration of an asymmetric modulation constellation for demodulation of at least one wireless data signal from the network entity;
modulate data symbols based at least in part on the configuration of the asymmetric modulation constellation; and
transmit a wireless data signal to the UE, the wireless data signal comprising the data symbols modulated in accordance with the asymmetric modulation constellation.

14. The network entity of claim 13, wherein the capability message indicates a capability of the UE to support channel characterization estimation without receiving downlink pilot signaling or with reduced downlink pilot signaling, the reduced downlink pilot signaling comprising a first amount of pilot signaling transmitted within a timespan or a frequency span that is smaller than a second amount of pilot signaling associated with an absence of the capability of the UE.

15. The network entity of claim 13, wherein the message is associated with downlink control information indicating a symmetric modulation constellation, the message comprising an index indicating the asymmetric modulation constellation associated with the symmetric modulation constellation.

16. The network entity of claim 15, wherein the message indicating the asymmetric modulation constellation indicates a phase shift to a constellation point of the symmetric modulation constellation.

17. The network entity of claim 15, wherein:
the symmetric modulation constellation is included in a set of symmetric modulation constellations, each symmetric modulation constellation of the set of symmetric modulation constellations associated with a respective asymmetric modulation constellation of a set of asymmetric modulation constellations, and
each respective asymmetric modulation constellation of the set of asymmetric modulation constellations includes a different angular rotation of a respective constellation point relative to at least one other angular rotation of at least one other asymmetric modulation constellation in the set of asymmetric modulation constellations.

18. The network entity of claim 17, wherein each asymmetric modulation constellation of the set of asymmetric modulation constellations has a same average power as each associated symmetric modulation constellation of the set of symmetric modulation constellations.

19. The network entity of claim 13, wherein the asymmetric modulation constellation is asymmetric with respect to a rotation symmetry of a symmetric modulation constellation associated with the asymmetric modulation constellation.

20. A method for wireless communications by a user equipment (UE), comprising:
receiving, from a network entity, a message indicating a configuration of an asymmetric modulation constellation for demodulation of at least one wireless data signal from the network entity;
receiving a wireless data signal from the network entity, the wireless data signal comprising data symbols modulated in accordance with the asymmetric modulation constellation; and
demodulating the data symbols of the wireless data signal based at least in part on a channel characterization estimate of the wireless data signal, the channel characterization estimate associated with the configuration of the asymmetric modulation constellation.

21. The method of claim 20, further comprising:
transmitting, to the network entity, a capability message indicating a capability of the UE to support asymmetric modulation constellations, wherein the message indicating the configuration of the asymmetric modulation constellation is received in response to transmitting the capability message.

22. The method of claim 21, wherein the capability message indicates a capability of the UE to support channel characterization estimation without receiving downlink pilot signaling or with reduced downlink pilot signaling, the reduced downlink pilot signaling comprising a first amount of pilot signaling received within a timespan or a frequency span that is smaller than a second amount of pilot signaling associated with an absence of the capability of the UE.

23. The method of claim 20, further comprising:
determining the channel characterization estimate based at least in part on the configuration of the asymmetric modulation constellation and at least one data symbol of the data symbols.

24. The method of claim 23, wherein determining the channel characterization estimate comprises:
determining a first rotation section of a first set of rotation sections associated with the at least one data symbol;
determining a phase rotation within the first rotation section associated with the at least one data symbol;

determining a second rotation section of a second set of rotation sections that disambiguates the at least one data symbol; and generating a phase noise estimate based at least in part on the phase rotation and the second rotation section that disambiguates the at least one data symbol.

25. A method for wireless communications by a network entity, comprising:

receiving, from a user equipment (UE), a capability message indicating a capability of the UE to support asymmetric modulation constellations;

transmitting, to the UE, in response to receiving the capability message, a message indicating a configuration of an asymmetric modulation constellation for demodulation of at least one wireless data signal from the network entity;

modulating data symbols based at least in part on the configuration of the asymmetric modulation constellation; and transmitting a wireless data signal to the UE, the wireless data signal comprising the data symbols modulated in accordance with the asymmetric modulation constellation.

26. The method of claim 24, wherein the capability message indicates a capability of the UE to support channel characterization estimation without receiving downlink pilot signaling or with reduced downlink pilot signaling, the reduced downlink pilot signaling comprising a first amount of pilot signaling transmitted within a timespan or a frequency span that is smaller than a second amount of pilot signaling associated with an absence of the capability of the UE.

27. The method of claim 25, wherein the message is associated with downlink control information indicating a symmetric modulation constellation, the message comprising an index indicating the asymmetric modulation constellation associated with the symmetric modulation constellation.

28. The method of claim 27, wherein the message indicating the asymmetric modulation constellation indicates a phase shift to a constellation point of the symmetric modulation constellation.

* * * * *